US012437714B2

(12) United States Patent
Li

(10) Patent No.: US 12,437,714 B2
(45) Date of Patent: Oct. 7, 2025

(54) DISPLAY PANEL, DISPLAY DEVICE, AND METHOD FOR COMPENSATING SIGNAL

(71) Applicants: Yunnan Invensight Optoelectronics Technology Co., Ltd., Yunnan (CN); BOE Technology Group Co., Ltd., Beijing (CN)

(72) Inventor: Dachao Li, Beijing (CN)

(73) Assignees: YUNNAN INVENSIGHT OPTOELECTRONICS TECHNOLOGY CO., LTD., Yunnan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/269,290

(22) PCT Filed: Mar. 29, 2022

(86) PCT No.: PCT/CN2022/083723

§ 371 (c)(1),
(2) Date: Jun. 23, 2023

(87) PCT Pub. No.: WO2023/184158

PCT Pub. Date: Oct. 5, 2023

(65) Prior Publication Data

US 2024/0420632 A1 Dec. 19, 2024

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01);
(Continued)

(58) Field of Classification Search
CPC ......... G09G 3/3233; G09G 2300/0426; G09G 2300/0842; G09G 2300/0861;
(Continued)

(56) References Cited

U.S. PATENT DOCUMENTS

| | | | |
|---|---|---|---|
| 2005/0140606 | A1 | 6/2005 | Choi et al. |
| 2007/0075940 | A1 | 4/2007 | Nakamura |

(Continued)

FOREIGN PATENT DOCUMENTS

| | | | |
|---|---|---|---|
| CN | 101312004 A | 11/2008 | |
| CN | 102237036 A | 11/2011 | |

(Continued)

OTHER PUBLICATIONS

China National Intellectual Property Administration, First office action of Chinese application No. 202280000588.3 issued on Jun. 18, 2025, which is foreign counterpart application of this US application, 19 pages including English translation.

*Primary Examiner* — Kwin Xie
(74) *Attorney, Agent, or Firm* — XSENSUS LLP

(57) ABSTRACT

Provided is a display panel. The display panel includes: a substrate, having a display region and a non-display region at least partially surrounding the display region; a plurality of pixels, disposed in the display region, wherein the plurality of pixels are coupled to a drive circuit and configured to emit light; a temperature sensing circuit, disposed in the non-display region, wherein the temperature sensing circuit is coupled to a first reference power supply terminal, a second reference power supply terminal and a first power supply terminal, and further coupled to the drive circuit; and a trim circuit, disposed in the non-display region, wherein the trim circuit is coupled to the first reference power supply terminal, a plurality of trim control terminals and the first power supply terminal, and further coupled to the drive circuit.

18 Claims, 9 Drawing Sheets

(52) U.S. Cl.
CPC . *G09G 2300/0861* (2013.01); *G09G 2310/08* (2013.01); *G09G 2320/0233* (2013.01); *G09G 2320/041* (2013.01); *G09G 2330/02* (2013.01)

(58) Field of Classification Search
CPC ....... G09G 2310/08; G09G 2320/0233; G09G 2320/041; G09G 2330/02
USPC ........................................................... 345/212
See application file for complete search history.

(56) References Cited

U.S. PATENT DOCUMENTS

| | | | | |
|---|---|---|---|---|
| 2007/0132674 | A1* | 6/2007 | Tsuge | G09G 3/2074 345/77 |
| 2008/0018569 | A1 | 1/2008 | Sung et al. | |
| 2008/0290806 | A1 | 11/2008 | Tada et al. | |
| 2011/0273427 | A1 | 11/2011 | Park | |
| 2012/0056537 | A1 | 3/2012 | Koyama | |
| 2016/0049111 | A1 | 2/2016 | Lee et al. | |
| 2017/0206836 | A1* | 7/2017 | Kim | G09G 3/3233 |
| 2018/0090062 | A1 | 3/2018 | Nakamura | |
| 2018/0090103 | A1* | 3/2018 | Zhang | G01K 13/00 |
| 2020/0200612 | A1 | 6/2020 | Iwasa | |
| 2021/0048860 | A1* | 2/2021 | Jinta | G09F 9/30 |
| 2021/0082352 | A1 | 3/2021 | Lee et al. | |
| 2021/0201718 | A1* | 7/2021 | Ha | G09G 3/006 |
| 2021/0210000 | A1* | 7/2021 | Lee | G09G 3/32 |
| 2021/0407411 | A1 | 12/2021 | Yang et al. | |
| 2022/0102583 | A1* | 3/2022 | Baumheinrich | G02B 6/12007 |
| 2022/0157225 | A1* | 5/2022 | Choi | G09G 3/32 |
| 2022/0262307 | A1* | 8/2022 | Pyun | G09G 3/3258 |

FOREIGN PATENT DOCUMENTS

| | | | | | |
|---|---|---|---|---|---|
| CN | 106910461 | A | | 6/2017 | |
| CN | 106935193 | A | | 7/2017 | |
| CN | 107274836 | A | | 10/2017 | |
| CN | 109883562 | A | | 6/2019 | |
| CN | 112509505 | A | | 3/2021 | |
| CN | 112599099 | A | | 4/2021 | |
| CN | 113748455 | A | | 12/2021 | |
| CN | 113853645 | A | | 12/2021 | |
| JP | 2008256827 | A | | 10/2008 | |
| JP | 2018-054915 | A | | 4/2018 | |
| KR | 101429918 | B1 | | 8/2014 | |
| TW | 201120851 | A | * | 6/2011 | G09G 3/3225 |
| TW | 201214235 | A | * | 4/2012 | G06F 3/0418 |

* cited by examiner

DISPLAY PANEL, DISPLAY DEVICE, AND METHOD FOR COMPENSATING SIGNAL

CROSS-REFERENCE TO RELATED APPLICATION

This application is a U.S. national phase application based on PCT/CN2022/083723, filed on Mar. 29, 2022, the disclosure of which is incorporated herein by reference in its entirety.

TECHNICAL FIELD

The present application related the field of display technology, and in particular to a display panel, a display device and a method for compensating signals.

BACKGROUND OF THE INVENTION

Silicon-based organic light-emitting diode (OLED) micro display is a display product that integrates OLED with silicon-based circuitry, which is often applied in the fields of virtual reality (VR) and augmented reality (AR).

SUMMARY OF THE INVENTION

Embodiments of the present application provide a display panel, a display device and a method for compensating signals. The technical solutions are as follows.

According to some embodiments of the present disclosure, a display panel is provided. The display panel includes:

a substrate, having a display region and a non-display region at least partially surrounding the display region;

a plurality of pixels, disposed in the display region, wherein the plurality of pixels are coupled to a drive circuit and configured to emit light based on a common supply voltage transmitted by the drive circuit;

a temperature sensing circuit, disposed in the non-display region, wherein the temperature sensing circuit is coupled to a first reference power supply terminal, a second reference power supply terminal and a first power supply terminal, and further coupled to the drive circuit, and the temperature sensing circuit is configured to transmit a target temperature sensing current to the drive circuit based on a temperature of the display region, under driving of a first reference power supply signal provided by the first reference power supply terminal, a second reference power supply signal provided by the second reference power supply terminal and a first power supply signal provided by the first power supply terminal; and a trim circuit, disposed in the non-display region, wherein the trim circuit is coupled to the first reference power supply terminal a plurality of trim control terminals and the first power supply terminal, and further coupled to the drive circuit, and the trim circuit is configured to transmit a target trim current to the drive circuit, under driving of a trim control signal provided by at least one of the trim control terminals, the first reference power supply signal and the first power supply signal;

wherein the target temperature sensing current and the target trim current are supplied to the drive circuit to compensate the common supply voltage.

In some embodiments, the temperature sensing circuit includes: a plurality of temperature sensing sub-circuits;

wherein each of the temperature sensing sub-circuits is coupled to the first reference power supply terminal, the second reference power supply terminal, the first power supply terminal and the drive circuit, and the temperature sensing sub-circuit is configured to transmit a temperature sensing current positively correlated with the temperature to the drive circuit based on the temperature of the display region, under driving of the first reference power supply signal, the second reference power supply signal and the first power supply signal;

wherein the target temperature sensing current is a sum of the temperature sensing currents transmitted by the plurality of temperature sensing sub-circuits.

In some embodiments, each of the temperature sensing sub-circuits includes: a first switch transistor and a second switch transistor;

wherein a gate electrode of the first switch transistor is coupled to the first reference power supply terminal, a first electrode of the first switch transistor is coupled to the first power supply terminal, and a second electrode of the first switch transistor is coupled to a first electrode of the second switch transistor; and a gate electrode of the second switch transistor is coupled to the second reference power supply terminal, and a second electrode of the second switch transistor is coupled to the drive circuit.

In some embodiments, the display region is rectangular, the non-display region encloses at least a first side and a second side opposite to each other in the first direction of the display region; wherein in the plurality of temperature sensing sub-circuits, one portion of the temperature sensing sub-circuits are disposed on the first side of the display region and are sequentially arranged along a second direction; and the other portion of temperature sensing sub-circuits are disposed on the second side of the display region and are sequentially arranged along the second direction, the first direction being intersected with the second direction.

In some embodiments, a quantity of the one portion of the temperature sensing sub-circuits is equal to a quantity of the other portion of the temperature sensing sub-circuits; and the one portion of the temperature sensing sub-circuits are equally spaced apart, and/or, the other portion of the temperature sensing sub-circuits are equally spaced apart.

In some embodiments, the first direction is perpendicular to the second direction.

In some embodiments, the trim circuit includes: a plurality of trim sub-circuits;

wherein each of the trim sub-circuits is coupled to the plurality of trim control terminals, the first reference power supply terminal, the first power supply terminal, and the drive circuit, and each of the trim sub-circuits is configured to transmit a trim current to the drive circuit, under driving of a trim control signal provided by at least one of the trim control terminals, the first reference power supply signal and the first power supply signal;

wherein the target trim current is a sum of the trim currents transmitted by the plurality of trim sub-circuits.

In some embodiments, the display region is rectangular, the non-display region encloses at least a first side, a second side and a third side of the display region, and the trim circuit includes two trim sub-circuits;

wherein one of the two trim circuits is disposed at an intersection of the third side and the first side of the display region, and the other trim circuit is disposed at an intersection of the third side and the second side of the display region.

In some embodiments, each of the trim sub-circuits includes: a plurality of trim units;

wherein the plurality of trim units are coupled in one-to-one correspondence to the plurality of trim control terminals, and the trim units are further coupled to the first reference power supply terminal, the first power supply terminal and the drive circuit, and each of the trim units is configured to transmit a trim current to the drive circuit, under driving of a trim control signal provided by one of the trim control terminals coupled to the trim unit, the first reference power supply signal and the first power supply signal;

wherein the trim current is a sum of the trim sub-currents transmitted by the plurality of trim units.

In some embodiments, each of the trim units includes: a third switch transistor and a fourth switch transistor;

wherein a gate electrode of the third switch transistor is coupled to the first reference power supply terminal, a first electrode of the third switch transistor is coupled to the first power supply terminal, a second electrode of the third switch transistor is coupled to a first electrode pf the fourth switch transistor; and a gate electrode of the fourth switch transistor is coupled to the trim control terminal and a second electrode of the fourth switch transistor is coupled to the drive circuit.

In some embodiments, each of the trim sub-circuit includes: four trim units.

In some embodiments, the temperature sensing circuit and the trim circuit are coupled to a same output node, the output node being coupled to the drive circuit.

In some embodiments, the pixel includes: a pixel circuit disposed in the display region and the non-display region, and a light-emitting element disposed in the display region;

wherein the pixel circuit is coupled to a scan control terminal, a data signal terminal, a first light-emitting control terminal, a second light-emitting control terminal, a second power supply terminal, the first power supply terminal and a first electrode of the light-emitting element, and is configured to transmit a light-emitting drive signal to the first electrode of the light-emitting element based on a scan signal provided by the scan control terminal, a first light-emitting control signal provided by the first light-emitting control terminal, a second light-emitting control signal provided by the second light-emitting control terminal, a second power supply signal provided by the second power supply terminal and the first power supply signal; and a second electrode of the light-emitting element is coupled to a common power supply terminal, the common power supply terminal is configured to be coupled to the drive circuit and to receive a common power supply voltage provided by the drive circuit, and the light-emitting element is configured to emit light based on the common power supply voltage and the light-emitting drive signal.

In some embodiments, the pixel circuit includes: a light-emitting control sub-circuit disposed in the non-display region, and a data write sub-circuit, a storage sub-circuit and a drive sub-circuit disposed in the display region;

wherein the light-emitting control sub-circuit is coupled to the first light-emitting control terminal, the second light-emitting control terminal, the first power supply terminal, the second power supply terminal and a first node, the light-emitting control sub-circuit is configured to control, in response to the first light-emitting control signal, the on and off between the second power supply terminal and the first node, and is configured to control, in response to the second light-emitting control signal, on and off between the second power supply terminal and the first node;

the data write sub-circuit is coupled to the scan control terminal, the data signal terminal and a second node, and the data write sub-circuit is configured to, in response to the scan signal, control on and off between the data signal terminal and the second node;

the storage sub-circuit is coupled to the second node and the first power supply terminal, and is configured to store a potential of the second node based on the first power supply signal; and the drive sub-circuit is coupled to the first node, the second node and the first electrode of the light-emitting element, and is configured to transmit the light-emitting drive signal to the light-emitting element based on a potential of the first node and the potential of the second node.

In some embodiments, the light-emitting control sub-circuit includes a first light-emitting control transistor and a second light-emitting control transistor, the data write sub-circuit includes a data write transistor, the storage sub-circuit includes a storage capacitor, and the drive sub-circuit includes a drive transistor;

wherein a gate electrode of the first light-emitting control transistor is coupled to the first light-emitting control terminal, a first electrode of the first light-emitting control transistor is coupled to the second power supply terminal, a second electrode of the first light-emitting control transistor is coupled to the first node;

a gate electrode of the second light-emitting control transistor is coupled to the second light-emitting control terminal, a first electrode of the second light-emitting control transistor is coupled to the first power supply terminal, and a second electrode of the second light-emitting control transistor is coupled to the first node;

a gate electrode of the data write transistor is coupled to the scan control terminal, a first electrode of the data write transistor is coupled to the data signal terminal, and a second electrode of the data write transistor coupled to the second node;

a first terminal of the storage capacitor is coupled to the second node and a second terminal of the storage capacitor is coupled to the first power supply terminal; and a gate electrode of the drive transistor is coupled to the second node, a first electrode of the drive transistor is coupled to the first node, a second electrode of the drive transistor is coupled to the first electrode of the light-emitting element;

wherein the first light-emitting control transistor, the second light-emitting control transistor, the data write transistor and the drive transistor are N-type transistors.

In some embodiments, the plurality of pixels are arranged in arrays, and the plurality of pixels disposed in one row share one light-emitting control sub-circuit.

In some embodiments, the display panel is silicon-based organic light-emitting diode micro display panel.

According to some embodiments of the present disclosure, a display device is provided. The display device includes: a drive circuit and the display panel as described in the above aspect; wherein the drive circuit is coupled to the first reference power supply terminal, the second reference power supply terminal, the plurality of trim control terminals and the plurality of pixels of the display panel, and is configured to provide the first reference power supply signal to the first reference power supply terminal, the second reference power supply signal to the second reference power supply terminal, the trim control signal to the plurality of trim control terminals, and the common supply voltage to the plurality of pixels; and the drive circuit is further coupled to the temperature sensing circuit and the trim circuit of the display panel, and is configured to compensate the common supply voltage based on the target temperature sensing current transmitted by the temperature sensing circuit and the target trim current transmitted by the trim circuit.

According to some embodiments of the present disclosure, a method for compensating signals is provided. The method is applicable to a drive circuit including the display device as described the above aspect, and the method including:

providing a first reference power signal at a first potential to a first reference power supply terminal, providing a second reference power signal at a first potential to a second reference power supply terminal, providing a trim control signal at a first potential to at least one of a plurality of trim control terminals, and providing a trim control signal at a second potential to other trim control terminals other than the at least one trim control terminal;

receiving a target temperature sensing current transmitted by a temperature sensing circuit, wherein the target temperature sensing current is generated by the temperature sensing circuit based on a temperature of the display region of the display panel, under driving of the first reference power signal of the first potential, the second reference power signal of the first potential and the first power signal provided by a coupled first power supply terminal;

receiving a target trim current transmitted by a trim circuit, wherein the target trim current is generated by the trim circuit under driving of the first reference power signal of the first potential, the trim control signal of the first potential and the first power signal provided by the coupled first power supply terminal; and compensating a common supply voltage based on the target temperature sensing current and the target trim current, and transmitting the compensated common supply voltage to the plurality of pixels to drive a plurality of pixels to emit light.

In some embodiments, compensating the common supply voltage based on the target temperature sensing current and the target trim current includes:

determining a compensation current in response to accumulation of the target temperature sensing current and the target trim current;

converting the compensation current to a compensation voltage; and acquiring a compensated common supply voltage by accumulating the compensation voltage to the common supply voltage prior to compensation.

BRIEF DESCRIPTION OF DRAWINGS

In order to describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

Currently, silicon-based OLED micro display generally includes: a silicon-based OLED micro display panel and a drive circuit. The silicon-based OLED micro display panel generally includes a silicon-based substrate, and a plurality of pixel circuits and a plurality of OLEDs disposed on the silicon-based substrate. The drive circuit is coupled to the pixel circuits and is configured to transmit drive signals to the pixel circuits. The pixel circuits are coupled to the OLEDs and are configured to control the OLEDs to emit light based on the drive signals.

Marks in the drawing are illustrated as.

display panel, 10—drive circuit;

substrate, 02—pixel, 03—temperature sensing circuit, 04—trim circuit;

031—temperature sensing sub-circuit, 041—trim sub-circuit, 0411—trim unit, P1—pixel circuit, L1—light-emitting element, P11—light-emitting control sub-circuit, P12—data write sub-circuit, P13—storage sub-circuit, P14—drive sub-circuit;

A1—display region, B1—non-display region, a11—first side, a12—second side, a13—third side, X1—first direction, X2—second direction;

K1—first switch transistor, K2—second switch transistor, K3—third switch transistor, K4—fourth switch transistor, T1—first light-emitting control transistor, T2—second light-emitting control transistor, T3—data write transistor, T4—drive transistor, C1—storage capacitor;

Vref1—first reference power supply terminal, Vref2—second reference power supply terminal, Gnd—first power supply terminal, Elvdd—second power supply terminal, Trim 1 . . . . Trim n—trim control terminal, Scan—scan control terminal, Data—data signal terminal, EM1—first light—emitting control terminal, EM2—second light-emitting control terminal, Vcom—common power supply terminal;

N0—output node, N1—first node, N2—second node.

By means of the accompanying drawings above, definite embodiments of the present application have been illustrated and will be described in detail later. These accompanying drawings and text description are not intended to limit the scope of the present application conception by any means, but rather to illustrate the concepts of the present application for those skilled in the art by reference to particular embodiments.

DETAILED DESCRIPTION

For clearer descriptions of the objectives, technical solutions, and advantages of the present disclosure, the following further describes implementations of the present disclosure in detail with reference to the accompanying drawings.

Figure 1:
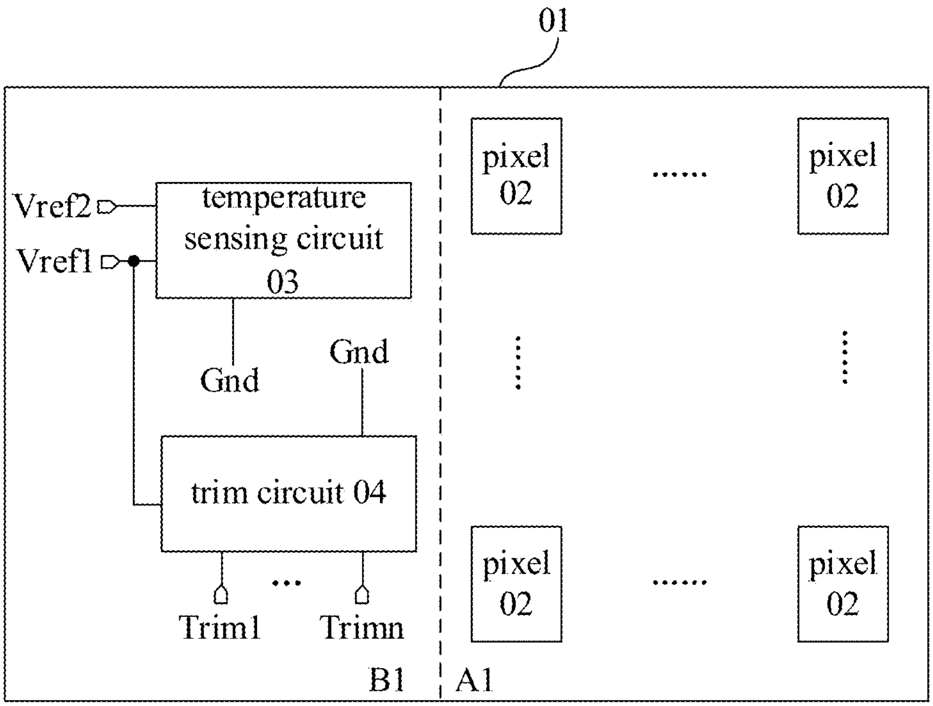
FIG. 1 is a schematic diagram of the structure of a display panel according to some embodiments of the present disclosure.

FIG. 1 is a schematic diagram of the structure of a display panel according to some embodiments of the present disclosure. As shown in FIG. 1, the display panel includes a substrate 01. The substrate 01 has a display region A1 and a non-display region B1 at least partially surrounding the display region A1.

For example, referring to FIG. 1, FIG. 1 illustrates substrate 01 in which the display region A1 is rectangular and the non-display region B1 is disposed on the left side of display region A1, next to (i.e., adjacent to and touching) the display region A1 and partially surrounding display region A1. The display region A1 is not limited to being rectangular. In some other embodiments, display region A1 may be circular. The non-display region B1 is not limited to being disposed on the left side of the display region A1. In some other embodiments, referring to FIG. 1, the non-display region B1 is disposed on the right side of the display region A1, or on all sides of the display region A1 and surrounding the display region A1.

It should be noted that the area of display region A1 is generally much larger than the area of non-display region B1, and the accompanying drawings are merely schematic and do not limit the area of display region A1 and non-display region B1.

As can be seen with reference to FIG. 1, the display panel in embodiments of the present disclosure further includes: a plurality of pixels 02 disposed in display region A1, and a temperature sensing circuit 03 and a trim circuit 04 disposed in non-display region B1.

The plurality of pixels 02 are coupled to a drive circuit (not shown in the figure) and are configured to emit light based on a common supply voltage transmitted by the drive circuit. The drive circuit is referred to as a driver integrated circuit (Driver IC). The drive circuit is generally disposed at the periphery of the display panel (i.e., not on substrate 01) and is tied to the structure coupled on the display panel. The drive circuit is considered to be disposed in the binding region. Alternatively, coupling in embodiments of the disclosure refers to "electrical connection".

The temperature sensing circuit 03 is coupled to the first reference power supply terminal Vref1, the second reference power supply terminal Vref2, and the first power supply terminal Gnd, and is also coupled to the drive circuit (not shown in the figure). The temperature sensing circuit 03 is configured to transmit a target temperature sensing current to the drive circuit based on the temperature of the display region A1, under driving of the first reference power supply signal provided by the first reference power supply terminal Vref1, the second reference power supply signal provided by the second reference power supply terminal Vref2, and the first power supply signal provided by the first power supply terminal Gnd.

Optionally, in some embodiments of the present disclosure, the temperature sensing circuit 03 includes a switch transistor (which may also be referred to as a switching transistor). The output characteristics of the switch transistor varies with the temperature of the display region A1. The temperature sensing circuit 03 transmits a target temperature sensing current I1, which is positively correlated with the temperature, to the drive circuit based on the temperature of the display region A1, under driving of the first reference power supply signal, the second reference power supply signal, and the first power supply signal, thereby enabling sensing of the temperature of the display region A1. That is, the higher the temperature is, the larger the target temperature sensing current I1 is. Conversely, the lower the temperature is, the smaller the target temperature sensing current I1 is.

The temperature of the display region A1 includes: a temperature of the substrate 01 and a temperature of the plurality of pixels 02 disposed in the display region A1, and the temperature is influenced by the ambient temperature. In general, the higher the ambient temperature is, the higher the temperature of the substrate 01 is, the higher the temperature of the plurality of pixels 02 is, and the higher the luminance of the plurality of pixels 02 is. The higher luminance further leads to a higher temperature of the plurality of pixels 02.

Optionally, in embodiments of the present disclosure, the potential of the first reference power signal and the potential of the second reference power signal are a first potential, and the potential of the first reference power signal is less than the potential of the second reference power signal. For example, the potential of the first reference power signal is about 1.5 V, and the potential of the second reference power signal is about 2.5 V. The potential of the first power signal is a second potential, and the second potential is less than the first potential. For example, the potential of the first power supply signal is 0 in the case that the first power supply terminal is the ground terminal Gnd. In some other embodiments, the potential of the first power supply signal is less than 0, in the case that the first power supply terminal is the pull-down power supply terminal VSS.

The trim circuit 04 is coupled to the first reference power supply terminal Vref1, the plurality of trim control terminals Trim 1 . . . . Trim n, and the first power supply terminal Gnd, and is also coupled to the drive circuit. The trim circuit 04 is configured to transmit a target trim current to the drive circuit, under driving of the trim control signal, the first reference power supply signal and the first power supply signal provided by the at least one trim control terminal, and n is an integer greater than 1.

For example, the trim circuit 04 transmits a target trim current I2 to the drive circuit based on the at least one trim control signal, the first reference power supply signal, and the first power supply signal in the case that the potential of the at least one trim control signal provided by the at least one trim control terminal is a first potential. The target trim current I2 is configured to correct the target temperature sensing current I1, such that the current finally transmitted to the drive circuit can provide more accurate feedback of the temperature of the display region A1 in the display panel.

Optionally, in the plurality of trim control terminals Trim 1 . . . . Trim n in the embodiments of the present disclosure, the potential of the trim control signal provided by each trim control terminal is a first potential. Alternatively, the potential of the trim control signal provided by one portion of the trim control terminals is a first potential, and the potential of the trim control signal provided by the other portion of the trim control terminals is a second potential. The more the trim control signals of the first potential are, the larger the target trim current I2 transmitted by the trim circuit 04 is, and conversely, the less the trim control signals of the first potential are, the smaller the target trim current I2 transmitted by the trim circuit 04 is. Based on this, the correction accuracy of the target temperature sensing current I1 is improved by flexibly controlling the trim control signals provided by each trim control terminal.

Optionally, in the embodiment of the present disclosure, the first potential of the trim control signal is about 2.5V and the second potential of the trim control signal is 0. For the temperature sensing circuit 03 and the trim circuit 04, the first potential is an effective potential and the second potential is an ineffective potential.

The target temperature sensing current I1 and the target trim current I2 are supplied to the drive circuit to compensate the common supply voltage. For example, the drive circuit may accumulate the target temperature sensing current I1 and the target trim current I2 to acquire a compensation current $I_{PTAT}$, convert the compensation current $I_{PTAT}$ to a compensation voltage ΔV, and compensate the to-be-compensated common supply voltage based on the compensation voltage ΔV (e.g., by accumulating both). Pixel 02 under driving of the compensated common supply voltage has better luminance and better luminance stability.

In some other embodiments, the compensation current $I_{PTAT}$ is converted to the compensation voltage ΔV by a voltage conversion circuit independent of the drive circuit and then transmitted to the drive circuit, and the drive circuit need not perform the current conversion voltage operation. In addition, the first reference power supply terminal Vref1, the second reference power supply terminal Vref2 and the trim control terminal in the above embodiment is also coupled to the drive circuit, that is, the drive circuit provides the required signal to each signal terminal. That is, in the embodiment of the present disclosure, a current or voltage proportional to the absolute temperature of the display region A1 is transmitted back to the drive circuit by the trim circuit 04 in conjunction with the temperature sensing circuit 03, under driving of the above signals provided by the drive circuit, and the common supply voltage can be compensated by the drive circuit using an algorithm related to compensation to ensure a better luminance stability of the pixel 02.

It is noted that a display panel is typically cut from a large substrate including a plurality of display panels, and the plurality of display panels is considered as a batch of display panels. Depending on the cutting process and the manufacturing process, the display panels finally acquired from cutting have differences, such as different aspect ratios of the transistors included in the temperature sensing circuit 03 or the transistors included in the pixel 02. The target temperature sensing currents I1 output by the temperature sensing circuit 03 based on the same temperature sensed are different in different display panels. Based on this, it is possible to set the trim control signals provided by a plurality of trim control terminals and store the trim control signals in the drive circuit during the testing stage before the display panel leaves factory, with reference to the target common supply voltage that can normally light up pixel 02 at different temperatures, such that the drive circuit can directly recall the stored trim control signals and provide corresponding trim control signals to each trim control terminal after the display panel leaves factory, the compensated common supply voltage is as close to (e.g., equal to) the target common supply voltage as possible, and the display panel of one batch has good uniformity of luminance under the same temperature, i.e., the display effect is approximate or consistent.

In summary, embodiments of the present disclosure provide a display panel including a substrate having a display region and a non-display region, pixels disposed in the display region, and a temperature sensing circuit and a trim circuit disposed in the non-display region. The temperature sensing circuit can transmit a target temperature sensing current to the drive circuit based on the temperature of the display region, and the trim circuit can transmit a target trim current to the drive circuit. The target temperature sensing current and the target trim current can be used by the drive circuit to compensate the common supply voltage and transmit the compensated common supply voltage to the pixel to drive the pixel to emit light, i.e., the drive circuit can flexibly adjust the common supply voltage transmitted to the pixel based on the temperature of the display region. In this way, the effect of temperature on the luminance of the pixel can be reduced, ensuring that the pixel can emit light normally even in the case that more heat is gathered in the display region. The display panel provided by the embodiments of present disclosure has a better display effect.

Optionally, the display panel documented in embodiments of the present disclosure is a silicon-based OLED micro display panel. That is, substrate 01 is a silicon-based substrate, and pixel 02 includes an OLED light-emitting device. For a silicon-based OLED micro display panel, a display panel is considered as a chip, and the trim circuit 04 is provided to reduce the difference between the chips (i.e., chip difference).

Optionally, the size of the silicon-based OLED micro display panel generally is about 1 inch. Because the silicon-based OLED micro display panels integrate the dual advantages of silicon-based materials and OLED light-emitting materials, ultra-high pixels per inch (PPI) can be achieved. OLED micro displays are widely applied in the field of VR and/or AR. For example, it can be applied in camera viewfinders or scopes in the field of VR.

Figure 2:
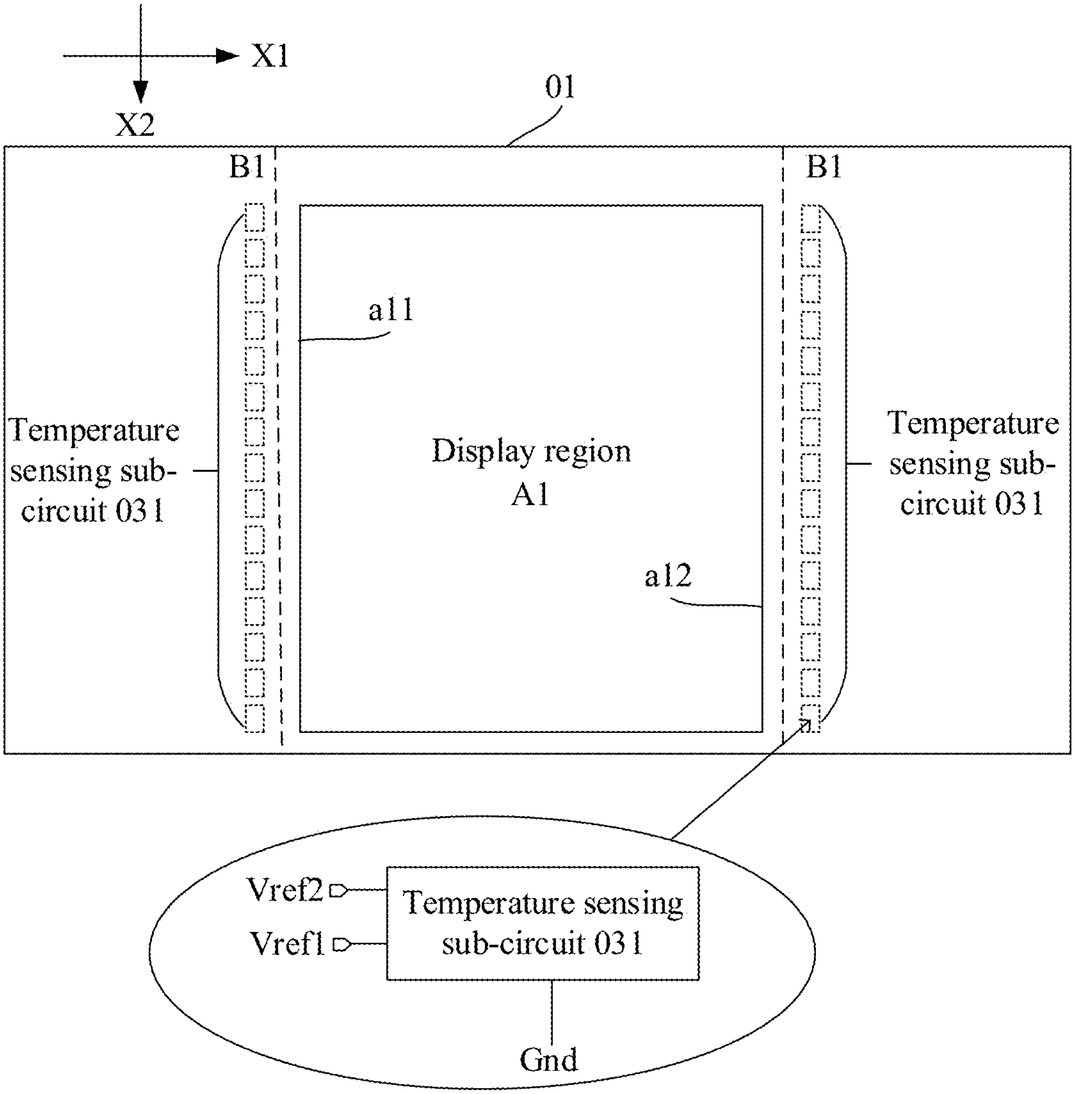
FIG. 2 is a schematic diagram of the structure of another display panel according to some embodiments of the present disclosure.

Optionally, FIG. 2 is a schematic diagram of the structure of another display panel according to some embodiments of the present disclosure. With reference to FIG. 2, the temperature sensing circuit 03 includes: a plurality of temperature sensing sub-circuits 031. FIG. 2 also schematically illustrates a structural diagram of a temperature sensing sub-circuit 031.

As can be seen in conjunction with FIG. 1 and FIG. 2, each of the plurality of temperature sensing sub-circuits 031 included in the temperature sensing circuit 03 can be coupled to a first reference power supply terminal Vref1, a second reference power supply terminal Vref2, and a first power supply terminal Gnd, and can be couple to a drive circuit. Based on this, each temperature sensing sub-circuit 031 is configured to transmit a temperature sensing current to the drive circuit based on the temperature of the display region A1, under driving of the first reference power supply signal, the second reference power supply signal and the first power supply signal. The temperature sensing current is positively correlated with the temperature.

In the embodiments of present disclosure, the target temperature sensing current I1 transmitted by the temperature sensing circuit 03 to the drive circuit is the sum of the temperature sensing currents I01 transmitted by the plurality of temperature sensing sub-circuits 031. That is, I1 equals to a quantity of temperature sensing sub-circuits 031 multiply I01. For example, assuming that the display panel includes 30 temperature sensing sub-circuits 031 as shown in FIG. 2, the target temperature sensing current I1=30*I01.

By setting a plurality of temperature sensing sub-circuits 031, the temperature at different locations of display region A1 can be reliably collected, and the target temperature sensing current I1 output to the drive circuit can more accurately reflect the temperature at various locations of display region A1.

Optionally, with continued reference to FIG. 2, it can be seen that the display region A1 having the substrate 01 is rectangular, and the non-display region B1 surrounds at least the first side a11 and the second side a12 opposite to each other in the first direction X1 of the display region A1. Based on this, one portion of the plurality of temperature sensing sub-circuits 031 is disposed on the first side of the display region A1 a11 of display region A1, and is arranged sequentially along the second direction X2. The other portion of the temperature sensing sub-circuit 031 other than the one portion of the temperature sensing sub-circuit 031 is disposed on the second side a12 of the display region A1, and is arranged sequentially along the second direction X2.

The first direction X1 and the second direction X2 are intersected with each other, e.g., the first direction X1 and the second direction X2 illustrated in FIG. 2 is perpendicular to each other. Assuming that the plurality of pixels 02 are arranged in a row and column array, the first direction X1 illustrated in FIG. 2 refers to the column direction and the second direction X2 refers to the row direction. The first side a11 is considered to be the left side of the display region A1 and the second side a12 is considered to be the right side of the display region A1.

As can be seen in conjunction with FIG. 2, one portion of the temperature sensing sub-circuits 031 disposed on the first side a11 has a same quantity of temperature sensing sub-circuits 031 as the other portion of the temperature sensing sub-circuits 031 disposed on the second side a12. Moreover, the one portion of the temperature sensing sub-circuits 031 are equally spaced apart, and/or, the other portion of the temperature sensing sub-circuits 031 are equally spaced apart. The spacing apart indicates that the spacing between each of the two adjacent temperature sensing sub-circuits 031 is a fixed spacing, such as being about 1 μm.

On the basis that the quantity of the one portion of the temperature sensing sub-circuits 031 is the same as the quantity of the other portion of the temperature sensing sub-circuits 031, and that both the one portion of the temperature sensing sub-circuits 031 and the other portion of the temperature sensing sub-circuits 031 are equally spaced apart, it is considered that the plurality of temperature sensing sub-circuits 031 included in the display panel are uniformly arranged around the periphery of the display region A1. In this way, the temperature at each location of display region A1 can be sensed effectively and uniformly, such that the target temperature sensing current I1 output by temperature sensing circuit 03 to the drive circuit can more accurately characterize the temperature at each location of display region A1, and the temperature reflected by the target temperature sensing current I1 can be equal to the average temperature of display region A1. It is possible to ensure reliable compensation of the common supply voltage by the drive circuit, and make the display effect of the display panel better.

Exemplarily, the temperature sensing circuit 03 illustrated in FIG. 2 includes: 30 temperature sensing sub-circuits 031 disposed in the non-display region B1. Half of the temperature sensing sub-circuits 031 are disposed in the first side a11 of the display region A1 and are equally and uniformly spaced. Half of the temperature sensing sub-circuits 031 are disposed in the second side a12 of the display region A1 and are equally and uniformly spaced.

Figure 3:
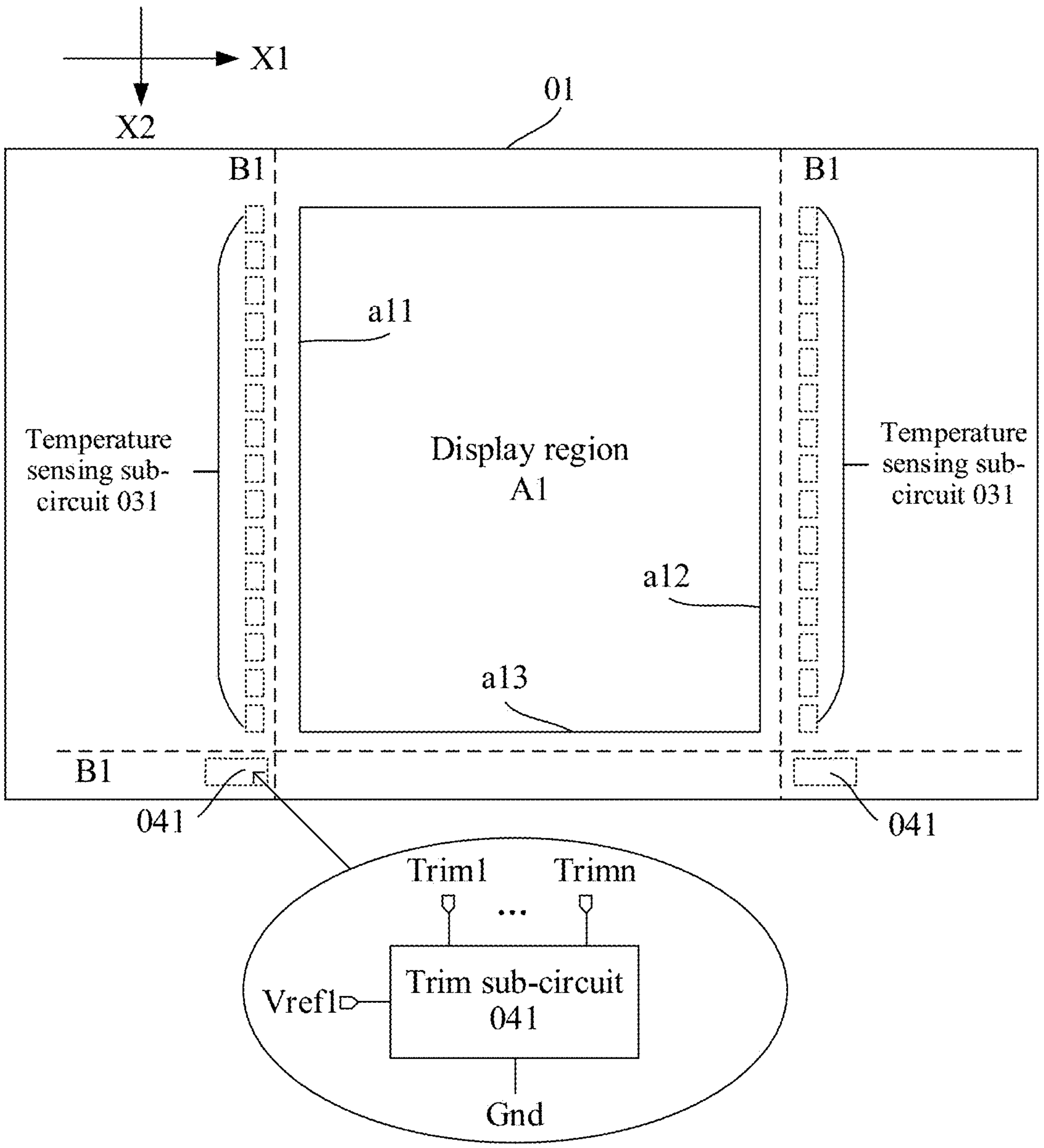
FIG. 3 is a schematic diagram of the structure of still another display panel according to some embodiments of the present disclosure.

Optionally, FIG. 3 is a schematic diagram of the structure of still another display panel according to some embodiments of the present disclosure. As shown in FIG. 3, the trim circuit 04 includes: a plurality of trim sub-circuits 041 (2 trim sub-circuits 041 are shown in FIG. 3). FIG. 3 also schematically illustrates a structural diagram of a trim sub-circuit 041.

In conjunction with FIG. 1 and FIG. 3, it can be seen that each of the trim sub-circuits 041 included in the trim circuit 04 is coupled to a plurality of trim control terminals Trim 1 . . . . Trim n, a first reference power supply terminal Vref1, and a first power supply terminal Gnd, and is used to couple to a drive circuit. Based on this, each of the trim sub-circuit 041 is configured to transmit a trim current to the drive circuit, under driving of the trim control signal, the first reference power supply signal and the first power supply signal provided by at least one of the trim control terminals.

Further, in some embodiments of the present disclosure, the target trim current I2 transmitted by the trim circuit 04 to the drive circuit is the sum of the trim currents I02 transmitted by the plurality of trim sub-circuits 041. That is, I2 equals to a quantity of trim sub-circuits 041 multiply I02. Assuming that the display panel includes 2 trim units 0411 as shown in FIG. 3, the target trim current I2=2*I02. By providing a plurality of trim sub-circuits 041, the accuracy of correction of the target temperature sensing current I1 is improved, thereby further improving the reliable compensation of the common supply voltage.

Optionally, as can be seen in conjunction with FIG. 2 and FIG. 3, the substrate 01 of the non-display region B1 surrounds at least a first side a11, a second side a12, and a third side a13 of the display region A1. The third side a13 is the lower side of the display region A1 shown in FIG. 3. Based on the plurality of temperature sensing sub-circuits 031 included in FIG. 2, the trim circuit 04 includes: two trim sub-circuits 041 illustrated in FIG. 3.

In the two trim sub-circuits 041, one trim sub-circuit 041 is disposed at the intersection of the third side a13 and the first side a11 of the display region A1, and the other trim sub-circuit 041 is disposed at the intersection of the third side a13 and the second side a12 of the display region A1. In this way, not only correction of the temperature sensing current output by each temperature sensing sub-circuit 031 disposed at the first side a11 can be achieved, but also correction of the temperature sensing current output by each temperature sensing sub-circuit 031 disposed at the second side a12 can be achieved, thereby ensuring a better correction effect.

Figure 4:
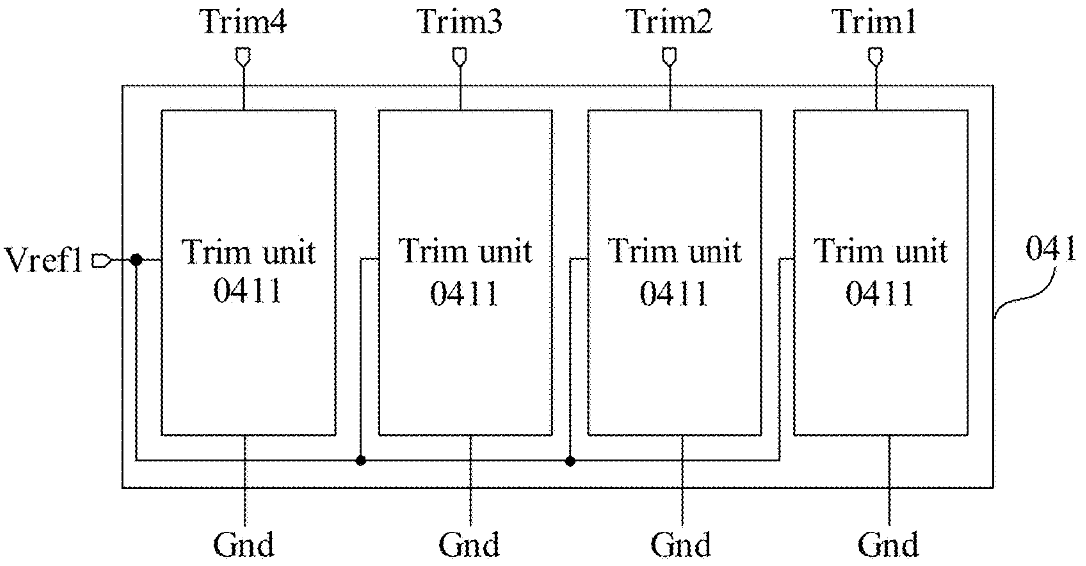
FIG. 4 is a schematic diagram of the structure of a trim sub-circuit according to some embodiments of the present disclosure.

FIG. 4 is a schematic diagram of the structure of a trim sub-circuit 041 according to some embodiments of the present disclosure. As can be seen with reference to FIG. 4, each of the trim sub-circuits 041 includes: a plurality of trim units 0411.

The plurality of trim units 0411 are coupled to the plurality of trim control terminals Trim 1 . . . Trim n, and each trim unit 0411 is coupled to the first reference power supply terminal Vref1 and the first power supply terminal Gnd, and all of the trim units 0411 are be coupled to the drive circuit. Each of the trim units 0411 is configured to transmit a trim current to the drive circuit, under driving of the trim control signal, the first reference power supply signal, and the first power supply signal provided by one of the coupled trim control terminals.

Exemplarily, each of the trim sub-circuits 041 illustrated in FIG. 4 includes four trim units 0411 and, correspondingly, four trim control terminals Trim 1, Trim2, Trim3, and Trim4. The four trim units 0411 are one-to-one coupled to those four trim control terminals Trim 1, Trim2, Trim3, and Trim4. Based on this, for example, the trim unit 0411 coupled to the trim control terminal Trim 1 can transmit a trim sub-current I03 to the drive circuit based on the trim control signal, the first reference power supply signal and the first power supply signal at the first potential in the case that the potential of the trim control signal provided by the trim control terminal Trim 1 is a first potential, and can transmit a trim sub-current I03 to the drive circuit in the case that the potential of the trim control signal provided by the trim control terminal Trim 1 provides a trim control signal with a second potential, it can be considered that the trim current I03 output by the trim unit 0411 is 0 at this time.

In some embodiments of the present disclosure, the trim current I02 transmitted by the trim sub-circuit 041 to the drive circuit is the sum of the trim sub-currents I03 transmitted by a plurality of trim units 0411. That is, I02 equals to a quantity of trim units 0411 multiply I03. Assuming that the display panel includes four trim units 0411 shown in FIG. 4, the trim current I02 generated by each trim sub-circuit 041=4*I03=I03+I03+I03+I03.

In combination with the above embodiments, it can be seen 15 trim manners based on including four trim units 0411, i.e., including four trim control terminals Trim 1, Trim2, Trim3, and Trim4. For example, in the case that the first potential of the trim control signal is 2.5V and the second potential is 0V, and the potential of the first reference power supply signal is 1.5V and the potential of the second reference power supply signal is 2.5V, Table 1 below shows the values of the compensation current $I_{PTAT}$ in microamps (μA) determined by the drive circuit during testing in the 15 trim manners.

TABLE 1

| Vref1/V | Trim 1/V | Trim2/V | Trim3/V | Trim4/V | Vref2/V | $I_{PTAT}$/μA |
|---|---|---|---|---|---|---|
| 1.5 | 0 | 0 | 0 | 2.5 | 2.5 | 165.3242 |
| 1.5 | 0 | 0 | 0 | 2.5 | 2.5 | 253.494 |
| 1.5 | 0 | 0 | 2.5 | 0 | 2.5 | 209.4094 |
| 1.5 | 0 | 0 | 2.5 | 2.5 | 2.5 | 297.578 |
| 1.5 | 0 | 2.5 | 0 | 0 | 2.5 | 187.3669 |
| 1.5 | 0 | 2.5 | 0 | 2.5 | 2.5 | 275.5361 |
| 1.5 | 0 | 2.5 | 2.5 | 0 | 2.5 | 231.4518 |
| 1.5 | 0 | 2.5 | 2.5 | 2.5 | 2.5 | 319.6197 |
| 1.5 | 2.5 | 0 | 0 | 0 | 2.5 | 176.3455 |
| 1.5 | 2.5 | 0 | 0 | 2.5 | 2.5 | 264.5151 |
| 1.5 | 2.5 | 0 | 2.5 | 0 | 2.5 | 220.4306 |
| 1.5 | 2.5 | 0 | 2.5 | 2.5 | 2.5 | 308.5989 |
| 1.5 | 2.5 | 2.5 | 0 | 0 | 2.5 | 198.3881 |
| 1.5 | 2.5 | 2.5 | 0 | 2.5 | 2.5 | 286.5571 |

TABLE 1-continued

| Vref1/V | Trim 1/V | Trim2/V | Trim3/V | Trim4/V | Vref2/V | $I_{PTAT}$/μA |
|---|---|---|---|---|---|---|
| 1.5 | 2.5 | 2.5 | 2.5 | 0 | 2.5 | 242.4729 |
| 1.5 | 2.5 | 2.5 | 2.5 | 2.5 | 2.5 | 330.6405 |

As can be seen from Table 1 above, in the case that the potential of the trim control signal provided by the trim control terminal Trim 1, the potential of the trim control signal provided by the trim control terminal Trim2 and the potential of the trim control signal provided by the trim control terminal Trim3 are the second potentials, and the potential of the trim control signal provided by the trim control terminal Trim4 is the first potential, the compensation current $I_{PTAT}$ is 165.3242 μA. As can be further seen from Table 1 above, the greater the quantity of trim control signals with the first potential is, the greater the compensation current $I_{PTAT}$ is.

It should be noted that, as can be seen with reference to the above embodiments, the specific trim manner to be used, i.e., which mode in the above Table 1 the potentials of the trim control signals provided by each trim control terminal satisfy, can be determined and stored in the drive circuit at pre-test stage prior to leaving factory to reduce the chip difference.

In some other embodiments, the above Table 1 may also be stored in the drive circuit in the form of a table or curve, and the target common supply voltage for driving the pixel 02 to emit light properly may be stored in the drive circuit. Then, the required compensation current $I_{PTAT}$ is determined by the drive circuit based on the common supply voltage prior to compensation and the target common supply voltage, and the potential of the trim control signal provided by each trim control terminal is looked up from the above Table 1 based on the determined compensation current $I_{PTAT}$ to further transmit the looked-up trim control signal to the trim control terminal to realize control of the trim control terminal.

Figure 5:
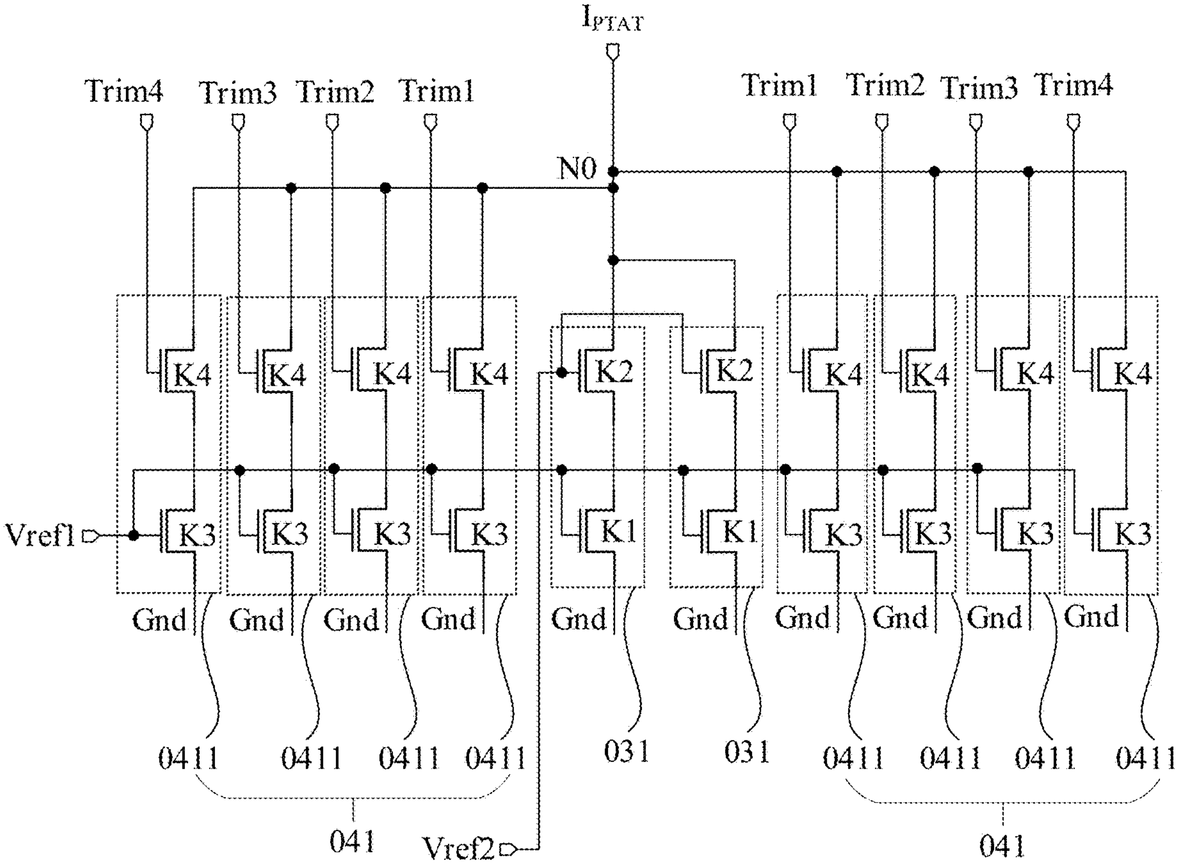
FIG. 5 is a circuit diagram of a temperature sensing sub-circuit and a trim sub-circuit according to some embodiments of the present disclosure.

Taking the structure shown in any of FIG. 2 to FIG. 4 as an example, FIG. 5 illustrates a schematic diagram of the structure of some circuits in a display panel. Referring to FIG. 5, it can be seen that each temperature sensing sub-circuit 031 includes: a first switch transistor K1 and a second switch transistor K2. Each trim unit 0411 includes: a third switch transistor K3 and a fourth switch transistor K4. FIG. 5 illustrates only one temperature sensing sub-circuit 031 disposed on the first side a11 and one temperature sensing sub-circuit 031 disposed on the second side a12 to represent all temperature sensing sub-circuits 031.

The gate electrode of the first switch transistor K1 is coupled to the first reference power supply terminal Vref1, the first electrode of the first switch transistor K1 is coupled to the first power supply terminal Gnd, and the second electrode of the first switch transistor K1 is coupled to the first electrode of the second switch transistor K2.

The gate electrode of the second switch transistor K2 is coupled to the second reference power supply terminal Vref2, and the second electrode of the second switch transistor K2 is configured to be coupled to the drive circuit.

Combined with the above embodiments, it can be seen that in the case that the temperature of display region A1 changes, the output performance of the first switch transistor K1 and the second switch transistor K2 changes, and the output temperature sensing current I01 changes, and generally the temperature sensing current I01 is absolutely positively correlated with the temperature. In this way, the purpose of reliably sensing the temperature of display region A1 can be achieved.

The gate electrode of the third switch transistor K3 is coupled to the first reference power supply terminal Vref1, the first electrode of the third switch transistor K3 is coupled to the first power supply terminal Gnd, and the second electrode of the third switch transistor K3 is coupled to the first electrode of the fourth switch transistor K4.

The gate electrode of the fourth switch transistor K4 is coupled to the trim control terminal, and the second electrode of the fourth switch transistor K4 is configured to be coupled to the drive circuit. For example, in FIG. 5, the gate electrodes of the four fourth switch transistors K4 included in each of the left and right trim sub-circuits 041 are coupled to the trim control terminal Trim 1, Trim2, Trim3, and Trim4.

Optionally, as can be seen in conjunction with FIG. 5, in the embodiments of present disclosure, the temperature sensing circuit 03 and the trim circuit 04 is coupled to one output node NO, and the output node N0 is configured to be coupled to the drive circuit. That is, the temperature sensing circuit 03 and the trim circuit 04 is coupled to the drive circuit via one output node N0. Accordingly, the current at the output node N0 is the compensation current $I_{PTAT}$ after accumulating the target temperature sensing current I1 and the target trim current I2, and it is determined that the current transmitted to the drive circuit is the compensation current $I_{PTAT}$, and the drive circuit can directly convert the compensation current $I_{PTAT}$ to the compensation voltage ΔV without performing the accumulation operation described in the above example, and the common supply voltage is compensated according to the compensation voltage ΔV. In this way, not only the operation of the drive circuit is simplified and the power consumption of the drive circuit is reduced, but also only one lead (also referred as a pin) on the drive circuit is occupied.

Of course, in some other embodiments, the temperature sensing circuit 03 and the trim circuit 04 are separately coupled to the drive circuit, and accordingly, the operation of accumulating the target temperature sensing current I1 and the target trim current I2 is performed by the drive circuit to acquire the desired compensation current $I_{PTAT}$.

Further, as can be seen in conjunction with the above embodiments and FIG. 5, each temperature sensing sub-circuit 031 includes a first switch transistor K1 and a second switch transistor K2 that are considered to be connected in series between the output node N0 and the first power supply terminal Gnd. The third switch transistor K3 and the fourth switch transistor K4 included in each trim unit 0411 are considered to be connected in series between the output node NO and the first power supply terminal Gnd.

Optionally, in some embodiments of the present disclosure, the switch transistors included in the temperature sensing sub-circuit 031 and the switch transistors included in the trim unit 0411, i.e., the first switch transistor K1, the second switch transistor K2, the third switch transistor K3, and the fourth switch transistor K4 illustrated in FIG. 5 are N-type transistors. Accordingly, for each switch transistor, the effective potential is high potential with respect to the invalid potential. Alternatively, each switch can be a metal-oxide-semiconductor (MOS) transistor. Thus, each switch can be made by an NMOS process.

By setting the switch transistor included in the temperature sensing sub-circuit 031 and the switch transistor included in the trim unit 0411 to be NMOS transistors, the gate electrodes is driven biased with the constant voltage in the above embodiments, and using its operating saturation region, a compensation current $I_{PTAT}$ proportional to the absolute temperature is output. The compensation current $I_{PTAT}$ is transmitted back (i.e., feedback) to the drive circuit, which can achieve the purpose of real-time monitoring of the temperature of display region A1 by the drive circuit, thus realizing the function related to the temperature compensation of the common supply voltage based on display region A1. Moreover, only NMOS transistors are arranged in the non-display region B1, which can facilitate circuit distribution and better detection of the temperature of the display region A1.

In some other embodiments, the switch transistors included in the temperature sensing sub-circuit 031, and/or, the individual switch transistors included in the trim unit 0411 are PMOS transistors, or a combination of PMOS transistors and NMOS transistors.

Figure 6:
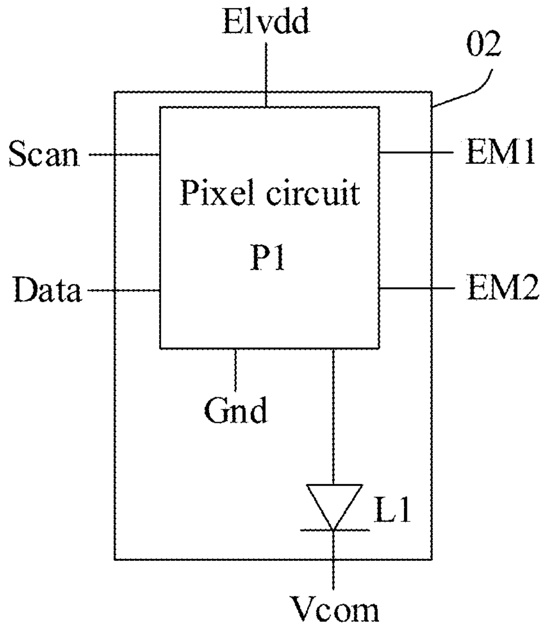
FIG. 6 is a schematic diagram of the structure of a pixel according to some embodiments of the present disclosure.

FIG. 6 is a schematic diagram of a structure of a pixel according to some embodiments of the present disclosure. As shown in FIG. 6, each pixel 02 includes: a pixel circuit P1 disposed in the display region A1 and the non-display region B1, and a light-emitting element L1 disposed in the display region A1. FIG. 6 does not delineate the display region A1 and the non-display region B1.

The pixel circuit P1 is coupled to the scan control terminal Scan, the data signal terminal Data, the first light-emitting control terminal EM1, the second light-emitting control terminal EM2, the second power supply terminal Elvdd, the first power supply terminal Gnd, and the first electrode of the light-emitting element L1. The pixel circuit P1 is configured to transmit a light-emitting drive signal (e.g., a drive current) to the first electrode of the light-emitting element L1 based on the scan signal provided by the scan control terminal Scan, the first light-emitting control signal provided by the first light-emitting control terminal EM1, the second light-emitting control signal provided by the second light-emitting control terminal EM2, the second power supply signal provided by the second power supply terminal Elvdd, and the first power supply signal.

The second electrode of the light-emitting element L1 is coupled to the common power supply terminal Vcom, and the common power supply terminal Vcom is configured to be coupled to the drive circuit and receive the common supply voltage provided by the drive circuit. The light-emitting element L1 is configured to emit light based on the common supply voltage and the light-emitting drive signal. For example, the light emitting element L1 emits light based on a voltage difference between the common supply voltage and the light-emitting drive signal. The common supply voltage provided by the drive circuit is a common supply voltage compensated by the drive circuit.

For example, assuming that the pixel circuit P1 transmits to the first electrode of the light-emitting element L1 with a potential of Vdata, a compensation voltage is ΔV, and the to-be-compensated public supply voltage is Vcom1, the compensation for the public supply voltage can be: accumulating the to-be-compensated public supply voltage Vcom1 with the compensation voltage ΔV. Then, the voltage difference between the first electrode and the second electrode of the light-emitting element L1 Voled=Vdata−(Vcom1+ΔV). After testing, the luminance stability of the light-emitting element L1 under the action of the pressure difference is good.

Optionally, combined with FIG. 6, the first electrode of the light-emitting element L1 is the anode, correspondingly, the second electrode of the light-emitting element L1 is the cathode. Of course, in some other embodiments, the first electrode of the light-emitting element L1 is a cathode, correspondingly, the second electrode of the light-emitting element L1 is an anode.

Figure 7:
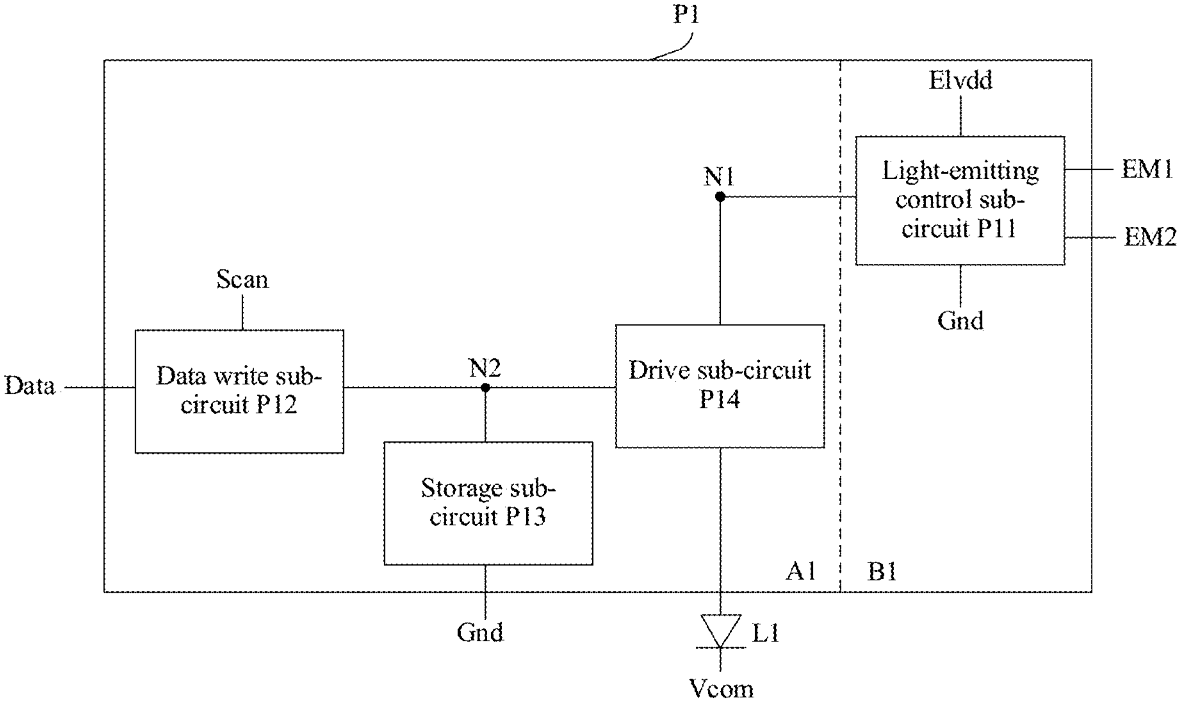
FIG. 7 is a schematic diagram of the structure of another pixel according to some embodiments of the present disclosure.

FIG. 7 is a schematic diagram of an alternative pixel structure according to some embodiments of the present disclosure. As shown in FIG. 7, the pixel circuit P1 includes: a light-emitting control sub-circuit P11 disposed in the non-display region B1, and a data write sub-circuit P12, a storage sub-circuit P13, and a drive sub-circuit P14 disposed in the display region A1.

The light-emitting control sub-circuit P11 is coupled to the first light-emitting control terminal EM1, the second light-emitting control terminal EM2, the first power supply terminal Gnd, the second power supply terminal Elvdd, and the first node N1. The light-emitting control sub-circuit P11 is configured to control an on/off between the second power supply terminal Elvdd and the first node N1 in response to the first light-emitting control signal, and to control an on/off between the first power supply terminal Gnd and the first node N1 in response to the second light-emitting control signal.

For example, the light-emitting control sub-circuit P11 controls the second power supply terminal Elvdd conduct with the first node N1 in the case that the potential of the first light-emitting control signal is a first potential. The second power supply terminal Elvdd then transmits the second power supply signal with the first potential to the first node N1 to charge the first node N1. The light-emitting control sub-circuit P11 controls the second power supply terminal Elvdd to be disconnected with the first node N1 in the case that the potential of the first light-emitting control signal is a second potential. The second power supply terminal Elvdd cannot transmit the second power supply signal with the first potential to the first node N1.

Similarly, the light-emitting control sub-circuit P11 controls the first power supply terminal Gnd to conduct with the first node N1 in the case that the potential of the second light-emitting control signal is the first potential. The first power supply terminal Gnd transmits the first power supply signal with the second potential to the first node N1 to discharge the first node N1. The light-emitting control sub-circuit P11 controls the first power supply terminal Gnd to be disconnected with the first node N1 in the case that the potential of the second light-emitting control signal is the second potential. The first power supply terminal Gnd cannot transmit the first power supply signal of the second potential to the first node N1.

It should be noted that for each sub-circuit in the pixel circuit P1, the first potential is a valid potential and the second potential is an invalid potential.

The data write sub-circuit P12 is coupled to the scan control terminal Scan, the data signal terminal Data, and the second node N2. The data write sub-circuit P12 is configured to control the on and off between the data signal terminal Data and the second node N2 in response to the scan signal.

For example, the data write sub-circuit P12 controls the data signal terminal Data to conduct with the second node N2 in the case that the potential of the scan signal is a first potential. The data signal terminal Data then transmits a data signal to the second node N2 to enable charging of the second node N2. The data write sub-circuit P12 controls the data signal terminal Data to be disconnected with the second node N2 in the case that the potential of the scan signal is the second potential. The data signal terminal Data cannot transmit the data signal to the second node N2.

The storage sub-circuit P13 is coupled to the second node N2 and the first power supply terminal Gnd. The memory sub-circuit P13 is configured to store the potential of the second node N2 based on the first power supply signal.

The drive sub-circuit P14 is coupled to the first node N1, the second node N2, and the first electrode of the light-emitting element L1, and is configured to transmit a light-emitting drive signal to the first electrode of the light-emitting element L1 to drive the light-emitting element L1 to emit light based on the potential of the first node N1 and the potential of the second node N2.

Figure 8:
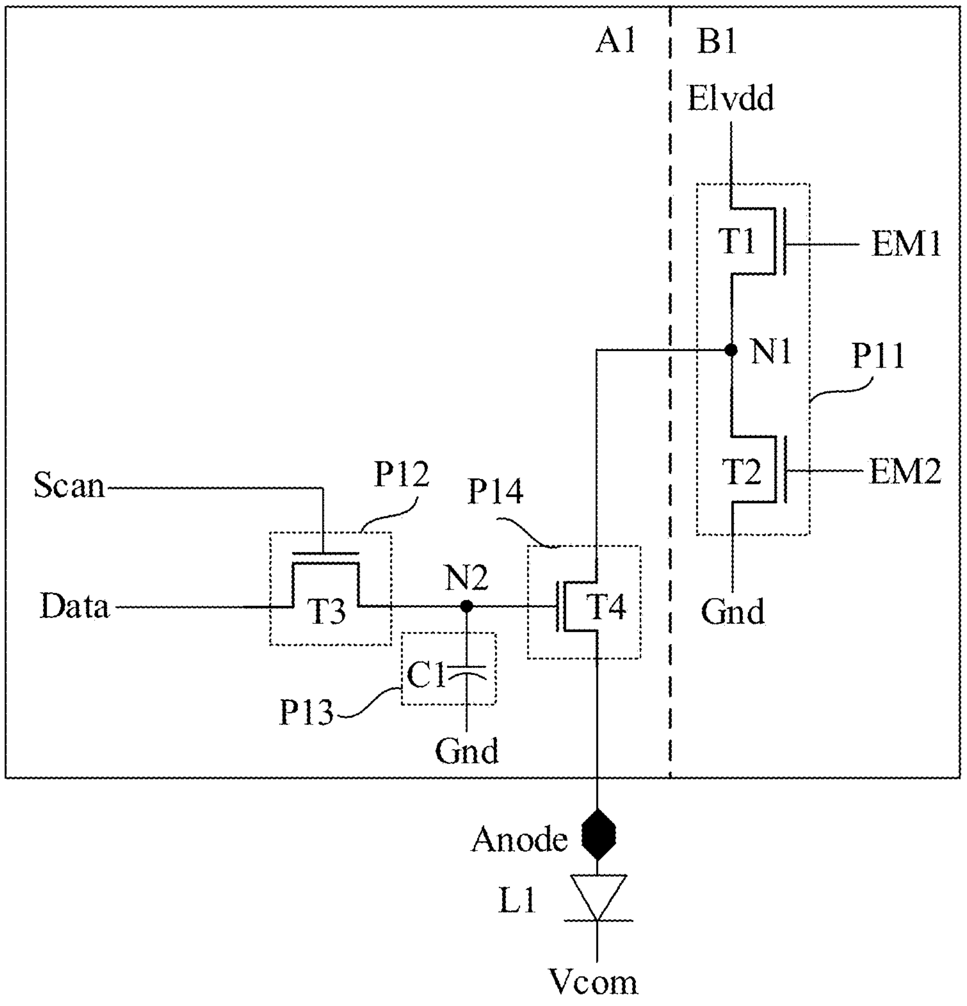
FIG. 8 is a schematic diagram of the structure of still another pixel according to some embodiments of the present disclosure.

FIG. 8 is a schematic diagram of the structure of still another pixel according to some embodiments of the present disclosure. As shown in FIG. 8, the light-emitting control sub-circuit P11 includes: a first light-emitting control transistor T1 and a second light-emitting control transistor T2. The data write sub-circuit P12 includes: a data write transistor T3. The storage sub-circuit P13 includes: a storage capacitor C1. The driving sub-circuit P14 includes: a drive transistor T4. Referring to FIG. 7, it is considered that the first light-emitting control transistor T1 and the second light-emitting control transistor T2 are disposed in the non-display region B1, and the data write transistor T3, the drive transistor T4, and the storage capacitor C1 are disposed in the display region A1. Accordingly, the circuit structure of the display region A1 is considered as a 2T1C (i.e., including 2 transistors and 1 capacitor) structure.

The gate electrode of the first light-emitting control transistor T1 is coupled to the first light-emitting control terminal EM1, the first electrode of the first light-emitting control transistor T1 is coupled to the second power supply terminal Elvdd, and the second electrode of the first light-emitting control transistor T1 is coupled to the first node N1.

The gate electrode of the second light-emitting control transistor T2 is coupled to the second light-emitting control terminal EM2, the first electrode of the second light-emitting control transistor T2 is coupled to the first power supply terminal Gnd, and the second electrode of the second light-emitting control transistor T2 is coupled to the first node N1.

The gate electrode terminal of the data write transistor T3 is coupled to the scan control terminal Scan, the first electrode of the data write transistor T3 is coupled to the data signal terminal Data, and the second electrode of the data write transistor T3 is coupled to the second node N2.

The first terminal of the storage capacitor C1 is coupled to the second node N2, and the second terminal of the storage capacitor C1 is coupled to the first power supply terminal Gnd.

The gate electrode of the drive transistor T4 is coupled to the second node N2, the first terminal of the drive transistor T4 is coupled to the first node N1, and the second terminal of the drive transistor T4 is coupled to the first terminal of the light emitting element L1 (e.g., the anode shown in, 8).

Optionally, in the embodiment of the present disclosure, the plurality of pixels 02 are arranged in an array, i.e., the plurality of pixels 02 are arranged in rows and columns, and the display panel includes a plurality of rows and columns of pixels. Based on this, the plurality of pixels 02 disposed in one row share one light-emitting control sub-circuit P11, i.e., they share the first light-emitting control transistor T1 and the second light-emitting control transistor T2 disposed in the non-display region B1. In other words, for each row of pixels 02, the display region A1 includes only the 2T1C circuit structure described in the above embodiment, and the non-display region B1 includes only a first light-emitting control transistor T1 and a second light-emitting control transistor T2, such that the PPI of the display panel can be effectively improved.

Optionally, in the embodiment of the present disclosure, the transistors included in each sub-circuit of the pixel circuit P1, i.e., the first light-emitting control transistor T1, the second light-emitting control transistor T2, the data write transistor T3, and the driving transistor T4 shown in FIG. 8, are N-type transistors. For example, they are NMOS transistors as described in the above embodiments, made by NMOS processes.

Currently, in silicon-based OLED micro displays, the display panel includes a pixel circuit that generally includes both NMOS transistors and PMOS transistors, i.e., it is made by a CMOS process that combines an NMOS process and a PMOS process. However, it has been tested that in the case that CMOS processes are used to form the pixel circuits, a variety of problems inevitably arise as follows.

Constrained by the design rule of CMOS process, the output uniformity of NMOS transistor and PMOS transistor is poor, based on which the channel width (W) and channel length (L) of transistor need to be adjusted, such as increasing W and L. In this way, it is not conducive to the design of high PPI of display panel, i.e., it constrains the high PPI design.

The film layer included in NMOS transistors and the film layer included in PMOS transistors need to be disposed on different sides and made of different masks. In this way, it not only causes the thickness of the display panel to be larger, but also more layers of masks need to be used in the case that the foundry of manufacturing the display panel manufactures the wafer, which is costly and complicated. The wafer is a display panel.

In the coexistence of NMOS transistors and PMOS transistors, in the case that a short circuit occurs between the cathode and anode of a light-emitting element L1, a latchup effect is brought, causing the light-emitting element L1 to fail to emit light under driving of the pixel circuit P1, i.e., the light-emitting element L1 does not emit light. The location of the light-emitting element L1 is shown as a black spot. The black spot causes the light-emitting element L1 disposed in the same column as the light-emitting element L1 to emit light abnormally, that is, spot-band line display anomaly occurs.

The general data write transistor T3 includes NMOS transistors and PMOS transistors, and the N-type substrate of the PMOS transistor is prone to leakage, causing the data signal to be mistakenly transmitted to the gate electrode of the drive transistor T4 and stored in the storage capacitor C1, which causes a bright spot to appear in the case that the display panel displays a low grayscale screen.

Therefore, manufacturing the pixel circuit P1 only by the NMOS process makes each of the transistors in the pixel circuit P1 is an N-type transistor, and the above plurality of problems of the conventional pixel circuit can be effectively solved. For example, it can not only facilitate the design of high PPI, reduce the quantity of mask layers of wafer made by the foundry, reduce the cost and simplify the process, but also prevent the problem of spot-band line and low grayscale bright spot brought by the short circuit of cathode and anode of light-emitting element L1, and ensure a better display effect of the display panel. In some other embodiments, the transistors included in each sub-circuit of the pixel circuit P1 are PMOS transistors.

Taking the pixel circuit P1 shown in FIG. 8, and the transistors in the pixel circuit P1 being N-type transistors with a high first potential and a low second potential as an example, the operating principle of the pixel circuit P1 is described as follows.

Figure 9:
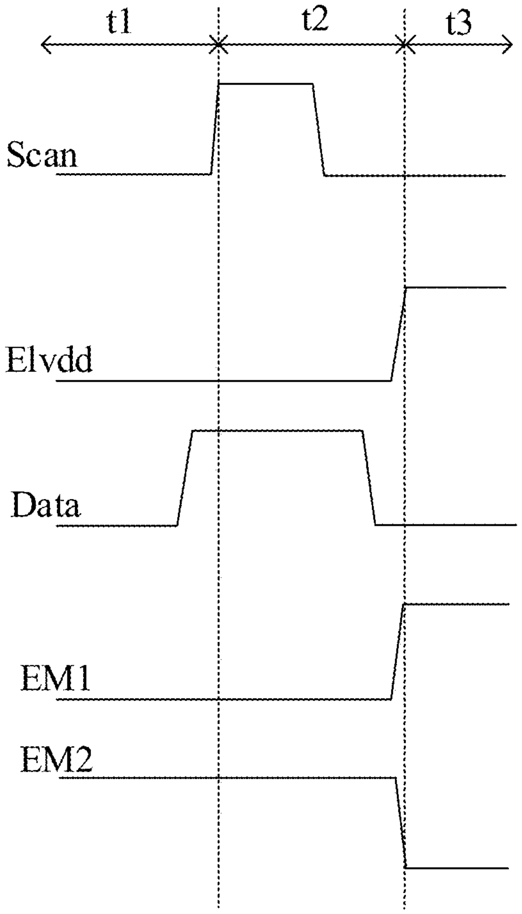
FIG. 9 is a timing diagram of each signal terminal to which a pixel is coupled according to some embodiments of the present disclosure.

FIG. 9 illustrates a timing diagram of each signal terminal to which the pixel circuit P1 is coupled. As shown in FIG. 9, driving the light-emitting element L1 to emit light includes: a reset phase t1, a data write phase t2, and a light-emitting phase t3.

In the reset phase t1, the potential of the scan control signal provided by the scan control terminal Scan, the potential of the second power supply signal provided by the second power supply terminal Elvdd, the potential of the data signal provided by the data signal terminal Data and the potential of the first light emitting control signal provided by the first light emitting control terminal EM1 are the second potential (i.e., low potential). Only the potential of the second light-emitting control signal provided by EM2 is the first potential (i.e., high potential). Moreover, the storage capacitor C1 holds the potential of the second node N2 in the phase to a high potential. Accordingly, the data write transistor T3 and the first light-emitting control transistor T1 are turned off, and the driving transistor T4 and the second light-emitting control transistor T2 are turned on. The first power signal with a low potential provided by the first power supply terminal Gnd is transmitted to the anode of the light-emitting element L1 via the turned-on second light-emitting control transistor T2 and the drive transistor T4, thereby enabling a reset of the anode.

In the data write phase t2, the potential of the scan control signal, the potential of the data signal and the potential of the second light-emitting control signal are high potentials, and the potential of the first light-emitting control signal and the potential of the second power supply signal are low potentials. Accordingly, the data write transistor T3, the second light-emitting control transistor T2 and the drive transistor T4 are turned on, and the first light-emitting control transistor T1 is turned off. The data signal is transmitted to the second node N2 via the turned-on data write transistor T3, thereby enabling data write.

In the light-emitting phase t3, the potential of the scan control signal, the potential of the data signal and the potential of the second light-emitting control signal are low potentials, and the potential of the second power supply signal and the potential of the first light-emitting control signal are high potentials. The potential of the second node N2 is held at a high potential under the storage effect of the storage capacitor C1. Accordingly, the data write transistor T3 and the second light-emitting control transistor T2 are turned off, and the first light-emitting control transistor T1 and the driving transistor T4 are turned on. The high potential second power signal is transmitted to the first node N1 via the turned-on first light-emitting control transistor T1. The drive transistor T4 transmits a drive current to the anode of the light-emitting element L1 based on the potential of this first node N1 and the potential of the second node N2 to illuminate the light-emitting element.

That is, in the embodiments of the present disclosure, data transmission is performed by the data write transistor T3 which is an NMOS transistor. By flexible design of the voltage magnitude (VGH) of the scan control signal provided by the scan control terminal Scan, the data write transistor T3 can transmit the highest grayscale voltage of VGH-Vth to the storage capacitor C1 (i.e., the second node N2) compared to a conventional CMOS transmission gate (i.e., including NMOS transistors and PMOS transistors), and Vth is the threshold voltage of the data write transistor T3. The data signal (i.e., the grayscale signal) transmitted to the storage capacitor C1 controls the gate potential of the drive transistor T4. The change of the gate potential of the drive transistor T4 further realizes the control of the anode potential of light-emitting element L1, such that the writing of data signals of different grayscales is realized, and the light-emitting element L1 emits light with the luminance corresponding to the grayscale.

Furthermore, the first light-emitting control transistor T1 and the second light-emitting control transistor T2 enable charging and discharging of the first node N1, and enable control of the anode potential of the light-emitting element L1. And at the same time, only one light-emitting control transistor is turned on. For example, in the case that the first light-emitting control transistor T1 is turned off and the second light-emitting control transistor T2 is turned on, the anode potential is discharged to the second potential of the first power signal, and the first power signal works with the common supply voltage to ensure that the light-emitting element L1 to achieve the luminance of 0 grayscale. In the case that the first light-emitting control transistor T1 is turned on and the second light-emitting control transistor T2 is turned off, the first node N1 is charged to the first potential of the second power signal. Further, the drive transistor T4 controls the anode potential of the light emitting element L1 by the grayscale signal written at its gate electrode and the second power supply signal written at its first electrode, which makes the light emitting element L1 reliably emit light.

It should be noted that in the first electrode and the second electrode of the transistor in the embodiments of present disclosure, one electrode refers to the source and the other electrode refers to the drain.

In summary, embodiments of the present disclosure provide a display panel including a substrate having a display region and a non-display region, pixels disposed in the display region, and a temperature sensing circuit and a trim circuit disposed in the non-display region. The temperature sensing circuit can transmit a target temperature sensing current to the drive circuit based on the temperature of the display region, and the trim circuit can transmit a target trim current to the drive circuit. The target temperature sensing current and the target trim current can be used by the drive circuit to compensate the common supply voltage and transmit the compensated common supply voltage to the pixel to drive the pixel to emit light, i.e., the drive circuit can flexibly adjust the common supply voltage transmitted to the pixel based on the temperature of the display region. In this way, the effect of temperature on the luminance of the pixel can be reduced, ensuring that the pixel can emit light normally even in the case that more heat is gathered in the display region. The display panel provided by the embodiments of present disclosure has a better display effect.

Figure 10:
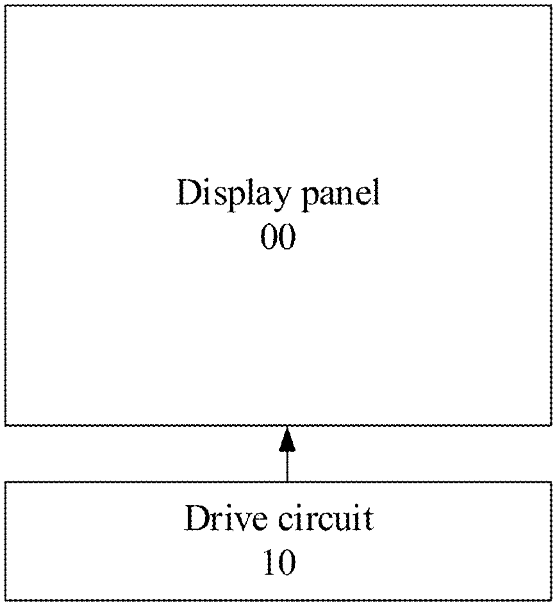
FIG. 10 is a schematic diagram of the structure of a display device according to some embodiments of the present disclosure.

FIG. 10 is a schematic diagram of the structure of a display device according to some embodiments of the present disclosure. As shown in FIG. 10, the display device includes: a drive circuit 10, and a display panel 00 as shown in the above accompanying drawings.

In conjunction with FIG. 1, the drive circuit 10 is coupled to a first reference power supply terminal Vref1, a second reference power supply terminal Vref2, a plurality of trim control terminals Trim 1 . . . . Trim n, and a plurality of pixels 02 in the display panel 00. The drive circuit 10 is configured to provide a first reference power supply signal to the first reference power supply terminal Vref1, a second reference power supply signal to the second reference power supply terminal Vref2, a trim control signal to the plurality of trim control terminals Trim 1 . . . . Trim n, and a common supply voltage to the plurality of pixels 02.

Further, the drive circuit 10 is coupled to the temperature sensing circuit 03 and the trim circuit 04 in the display panel 00. The drive circuit 10 is configured to compensate the common supply voltage based on the target temperature sensing current transmitted by the temperature sensing circuit 03 and the target trim current transmitted by the trim circuit 04.

That is, the circuit that provides a signal to the signal terminal coupled to the circuit in the display panel and the circuit that compensates for the common supply voltage is one circuit. In some other embodiments, the operation of providing the signal and the compensation are performed by two circuits separately.

Figure 11:
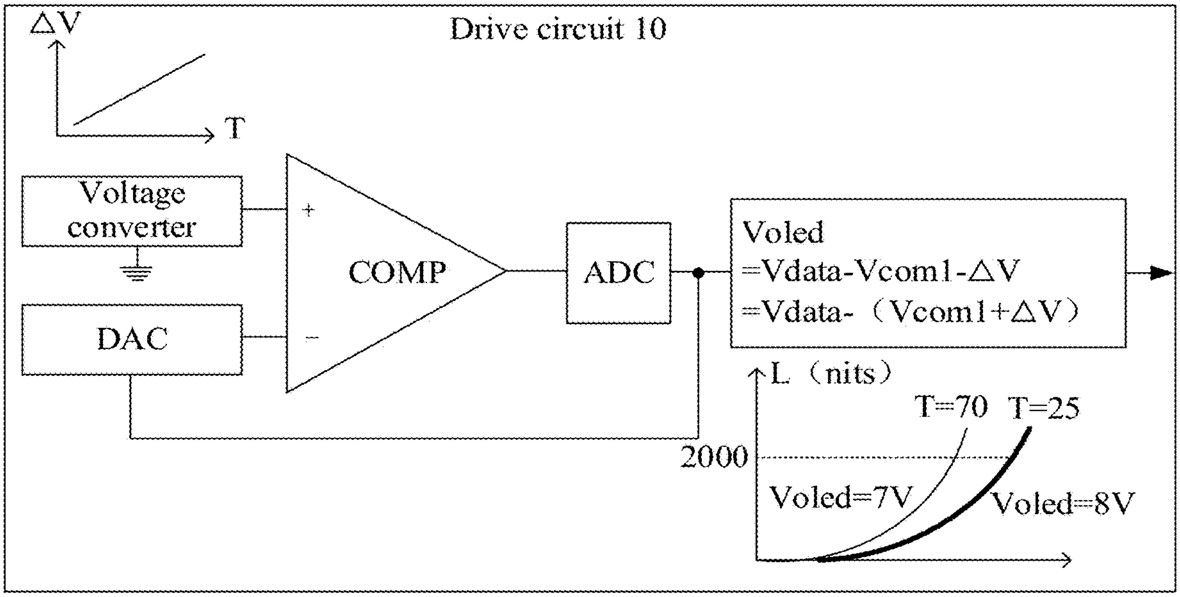
FIG. 11 is a schematic diagram of the structure of a drive circuit according to some embodiments of the present disclosure.

FIG. 11 is a schematic diagram of the internal structure of a drive circuit 10 according to some embodiments of the present disclosure. As shown in FIG. 11, the drive circuit 10 may include: a voltage converter, a comparator (COMP), an analog-to-digital converter (ADC), and a digital-to-analog converter (DAC).

The COMP has a positive input (+) and a negative input (−). The voltage converter is grounded and is coupled to the positive input (+) of the COMP. The negative input (−) of the COMP is coupled to the output of the DAC, and the output of the COMP is coupled to the input of the ADC. The output of the ADC is coupled to the input of the DAC and to the common power supply Vcom. In conjunction with FIG. 5, the voltage converter is coupled to the output node N0 to receive the compensation current $I_{PTAT}$.

The voltage converter is configured to convert the compensation current $I_{PTAT}$ to a compensation voltage ΔV and transmit the compensation voltage ΔV to the positive input of the comparator COMP. The comparator COMP is configured to receive an analog voltage (which may be referred to as a reference voltage) from the digital-to-analog converter DAC and is configured to compare the compensation voltage ΔV at the positive input (+) with the reference voltage at the negative input (−) and to transfer the comparison result to the analog-to-digital converter ADC. The analog-to-digital converter ADC is configured to convert the comparison result from an analog signal to a digital signal. The digital-to-analog converter DAC is configured to convert the digital signal into an analog signal and then transmit the analog signal to the negative input (−) of the comparator COMP, that is, the digital signal output from the analog-to-digital converter ADC is fed back to the negative input (−) of the comparator COMP via the digital-to-analog converter DAC. Ultimately, the output of the output of the ADC of the analog-to-digital converter converges to an absolute positive correlation with the temperature. The drive circuit 10 then compensates the to-be-compensated common supply voltage based on the compensation algorithm Voled=Vdata−(Vcom1+ΔV) as shown in FIG. 11. The light emitting element L1 under driving of the Voled has a better luminance stability.

The Voled is the voltage difference between the anode and cathode of the light-emitting element L1 and Vdata is the potential of the data signal, as described in the above embodiment. The top left corner of FIG. 11 shows a linear plot of temperature T satisfying with the compensation voltage ΔV, with the horizontal coordinate referring to the temperature T and the vertical coordinate referring to the compensation voltage Δ. The low right corner of FIG. 11 shows a graph of the relationship between luminance, temperature and Voled. The vertical coordinate refers to the brightness L in nits, the temperature is in degrees Celsius (°

C.), and the potential of the voltage is V. From this relationship diagram, it can be seen that the luminance of 2000 nits can be achieved by controlling Voled to be about 7V when the temperature T=70. When the temperature T=80, the control Voled is about 8V, and the luminance of 2000 nits can be achieved. In this way, it is determined that by compensating the common supply voltage, it makes the luminance of the light-emitting element L1 as consistent as possible under different temperatures, ensuring a better display effect of the display panel.

Optionally, in some embodiments of the present disclosure, the operation of the voltage comparator is independent of temperature to ensure subsequent reliable compensation of the common supply voltage. For example, the voltage comparator includes two resistors connected in series, and the resistance value of one resistor is positively correlated with temperature and the resistance value of the other resistor is negatively correlated with temperature so as to cancel each other out, such that the final output result of the voltage comparator is independent of temperature.

Optionally, as described in the above embodiments, the display device provided by embodiments of the present disclosure includes: a silicon-based OLED micro display device.

Figure 12:
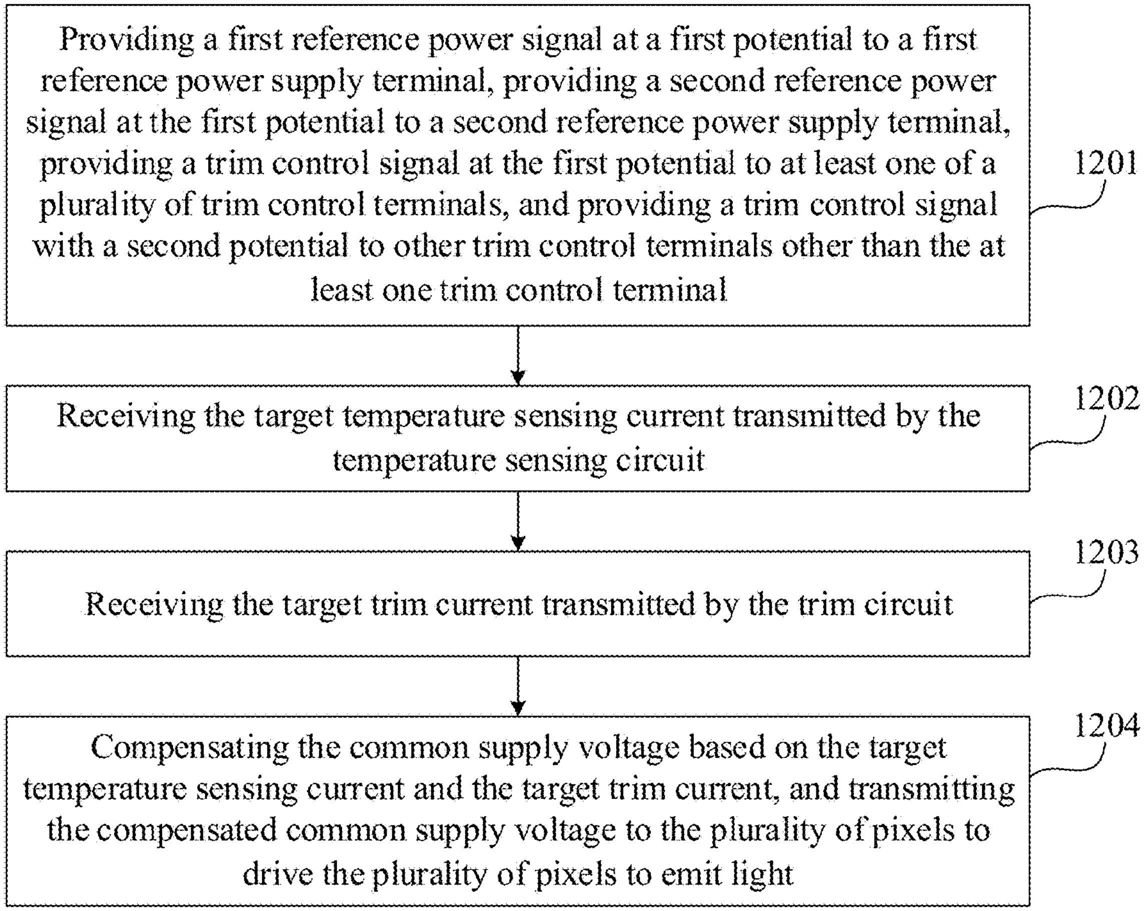
FIG. 12 is a flowchart of a method for compensating signals according to some embodiments of the present disclosure.

FIG. 12 is a flowchart of a method for compensating signals according to some embodiments of the present disclosure. The method can be applied in a drive circuit as shown in FIG. 10 or FIG. 11. As shown in FIG. 12, the method includes the following steps.

Step 1201, a first reference power signal at a first potential to a first reference power supply terminal is provided. A second reference power signal at the first potential to a second reference power supply terminal is provided, a trim control signal at the first potential to at least one of a plurality of trim control terminals is provided, and a trim control signal with a second potential to other trim control terminals other than the at least one trim control terminal is provided.

Step 1202, the target temperature sensing current transmitted by the temperature sensing circuit is received.

The target temperature sensing current is generated by the temperature sensing circuit based on the temperature of the display region in the display panel, under driving of the first reference power signal of the first potential, the second reference power signal of the first potential, and the first power signal provided by the coupled first power supply terminal.

Step 1203, the target trim current transmitted by the trim circuit is received.

The target trim current is generated by the trim circuit under driving of the first reference power signal of the first potential, the trim control signal of the first potential, and the first power signal provided by the coupled first power supply terminal.

Step 1204, the common supply voltage is compensated based on the target temperature sensing current and the target trim current, and the compensated common supply voltage is transmitted to the plurality of pixels to drive the plurality of pixels to emit light.

Figure 13:
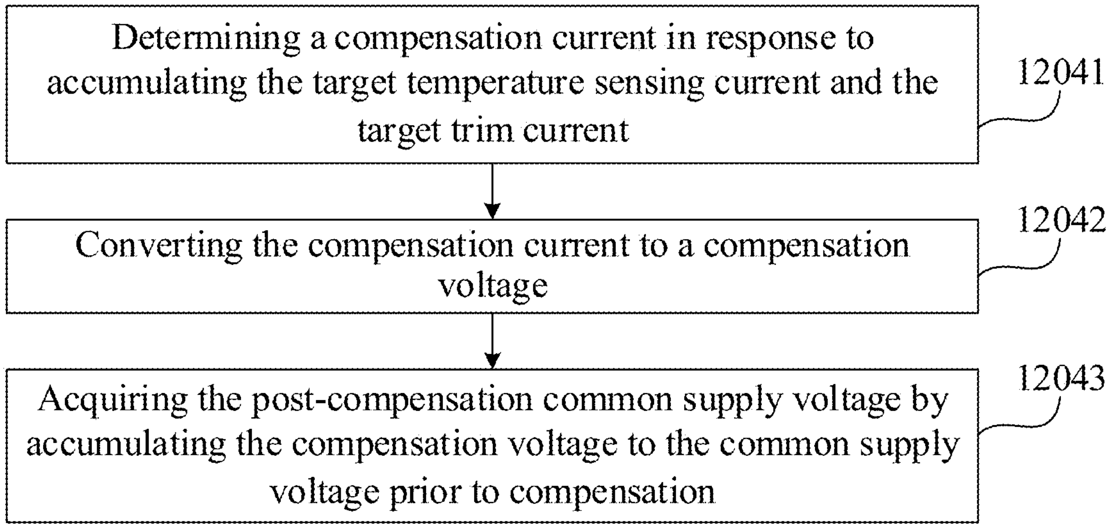
FIG. 13 is a flowchart of a method for compensating for a common supply voltage according to some embodiments of the present disclosure.

Optionally, referring to FIG. 13, compensating the common supply voltage based on the target temperature sensing current and the target trim current (i.e., step 1204 above), includes the follow steps.

Step 12041, a compensation current is determined in response to accumulating the target temperature sensing current and the target trim current.

Optionally, as described in the above embodiments, the temperature sensing circuit and the trim circuit are coupled to the drive circuit via one target node. Based on this, the drive circuit receives the compensation current directly from the target node. Alternatively, in some embodiments, the temperature sensing circuit and the trim circuit transmit the target temperature sensing current and the target trim current to the drive circuit respectively. Based on this, the drive circuit sums the target temperature sensing current and the target trim current to acquire the compensation current.

Step 12042, the compensation current is converted to a compensation voltage.

Optionally, in conjunction with the above embodiments, the drive circuit includes a voltage converter. The drive circuit converts the determined compensation current by the voltage converter to acquire the compensation voltage. In some embodiments, the compensation current is converted to a compensation voltage by a voltage converter circuit independent of the drive circuit and then transmitted to the drive circuit.

Step 12043, the post-compensation common supply voltage is acquired by accumulating the compensation voltage to the common supply voltage prior to compensation.

Optionally, in conjunction with the above embodiments, the drive circuit accumulates the determined compensation voltage to the to-be-compensated common supply voltage to acquire the compensated common supply voltage, such that the voltage difference between the anode and cathode of the light-emitting element=Vdata−(to-be-compensated common supply voltage+compensation voltage), ensuring a better luminance of the light-emitting element. In some other embodiments, depending on the application scenario, the drive circuit determines the difference between the compensation voltage and the to-be-compensated public supply voltage to acquire the compensated public supply voltage.

In summary, embodiments of the present disclosure provide a method for compensating signals. In the method, the drive circuit receives the target temperature sensing current transmitted by the temperature sensing circuit based on the temperature of a display region, receives the target trim current transmitted by the trim circuit, compensates the common supply voltage based on the target temperature sensing current and target trim current, and transmits the compensated common supply voltage to the pixel to drive the pixel to emit light, that is the drive circuit flexibly adjusts the common supply voltage transmitted to the pixel based on the temperature of the display region. In this way, the effect of the temperature on the luminance of light emitted by the pixel is reduced, ensuring that the pixel emits light normally in the case that more heat is gathered in the display region, and ensuring a better display effect of the display panel.

The terms in the embodiments section of the disclosure are used only for the purpose of explaining embodiments of this disclosure and are not intended to limit the disclosure. Unless otherwise defined, technical terms or scientific terms used in embodiments of the present disclosure shall have the ordinary meaning as understood by persons having ordinary skill in the art to which the present disclosure belongs.

For example, the words “first,” “second,” or “third,” and the like, as used in embodiments of the present disclosure, do not indicate any order, number, or importance, but are used only to distinguish the different components. Rather, they are used to distinguish between different components.

Similarly, the words “one” or “a” and the like do not indicate a quantitative limitation, but rather the presence of at least one.

"And/or" indicates that three kinds of relationships can exist, for example, A and/or B can indicate: A alone, both A and B, and B alone. The symbol "/" generally indicates an "or" relationship between the associated objects in front and behind.

The above mentioned are only optional embodiments of the present application and are not used to limit the present application. Any modification, equivalent replacement, improvement, etc. made in the spirit and principles of the present application shall be included in the scope of protection of the present application.

What is claimed is:

1. A display panel, comprising:

a substrate, having a display region and a non-display region at least partially surrounding the display region;

a plurality of pixels, disposed in the display region, wherein the plurality of pixels are coupled to a drive circuit and configured to emit light based on a common supply voltage transmitted by the drive circuit;

a temperature sensing circuit, disposed in the non-display region, wherein the temperature sensing circuit is coupled to a first reference power supply terminal, a second reference power supply terminal and a first power supply terminal, and further coupled to the drive circuit, and the temperature sensing circuit is configured to transmit a target temperature sensing current to the drive circuit based on a temperature of the display region, under driving of a first reference power supply signal provided by the first reference power supply terminal, a second reference power supply signal provided by the second reference power supply terminal and a first power supply signal provided by the first power supply terminal; and a trim circuit, disposed in the non-display region, wherein the trim circuit is coupled to the first reference power supply terminal, a plurality of trim control terminals and the first power supply terminal, and further coupled to the drive circuit, and the trim circuit is configured to transmit a target trim current to the drive circuit, under driving of a trim control signal provided by at least one of the trim control terminals, the first reference power supply signal and the first power supply signal;

wherein the target temperature sensing current and the target trim current are supplied to the drive circuit to compensate the common supply voltage;

the pixel comprises: a pixel circuit disposed in the display region and the non-display region, and a light-emitting element disposed in the display region;

the pixel circuit is coupled to a scan control terminal, a data signal terminal, a first light-emitting control terminal, a second light-emitting control terminal, a second power supply terminal, the first power supply terminal and a first electrode of the light-emitting element, and is configured to transmit a light-emitting drive signal to the first electrode of the light-emitting element based on a scan signal provided by the scan control terminal, a first light-emitting control signal provided by the first light-emitting control terminal, a second light-emitting control signal provided by the second light-emitting control terminal, a second power supply signal provided by the second power supply terminal and the first power supply signal;

a second electrode of the light-emitting element is coupled to a common power supply terminal, the common power supply terminal is configured to be coupled to the drive circuit and to receive a common power supply voltage provided by the drive circuit, and the light-emitting element is configured to emit light based on the common power supply voltage and the light-emitting drive signal;

the pixel circuit comprises: a light-emitting control sub-circuit disposed in the non-display region, and a data write sub-circuit, a storage sub-circuit and a drive sub-circuit disposed in the display region;

the light-emitting control sub-circuit is coupled to the first light-emitting control terminal, the second light-emitting control terminal, the first power supply terminal, the second power supply terminal and a first node, the light-emitting control sub-circuit is configured to control, in response to the first light-emitting control signal, on and off between the second power supply terminal and the first node, and is configured to control, in response to the second light-emitting control signal, on and off between the second power supply terminal and the first node;

the data write sub-circuit is coupled to the scan control terminal, the data signal terminal and a second node, and the data write sub-circuit is configured to, in response to the scan signal, control on and off between the data signal terminal and the second node;

the storage sub-circuit is coupled to the second node and the first power supply terminal, and is configured to store a potential of the second node based on the first power supply signal; and the drive sub-circuit is coupled to the first node, the second node and the first electrode of the light-emitting element, and is configured to transmit the light-emitting drive signal to the light-emitting element based on a potential of the first node and the potential of the second node.

2. The display panel according to claim 1, wherein the temperature sensing circuit comprises: a plurality of temperature sensing sub-circuits;

wherein each of the temperature sensing sub-circuits is coupled to the first reference power supply terminal, the second reference power supply terminal, the first power supply terminal and the drive circuit, and the temperature sensing sub-circuit is configured to transmit a temperature sensing current positively correlated with the temperature to the drive circuit based on the temperature of the display region, under driving of the first reference power supply signal, the second reference power supply signal and the first power supply signal;

wherein the target temperature sensing current is a sum of the temperature sensing currents transmitted by the plurality of temperature sensing sub-circuits.

3. The display panel according to claim 2, wherein each of the temperature sensing sub-circuits comprises: a first switch transistor and a second switch transistor;

wherein a gate electrode of the first switch transistor is coupled to the first reference power supply terminal, a first electrode of the first switch transistor is coupled to the first power supply terminal, and a second electrode of the first switch transistor is coupled to a first electrode of the second switch transistor; and a gate electrode of the second switch transistor is coupled to the second reference power supply terminal, and a second electrode of the second switch transistor is coupled to the drive circuit.

4. The display panel according to claim 2, wherein the display region is rectangular, the non-display region encloses at least a first side and a second side opposite to each other in a first direction of the display region; wherein in the plurality of temperature sensing sub-circuits, one portion of the temperature sensing sub-circuits are disposed on the first side of the display region and are sequentially arranged along a second direction; and the other portion of temperature sensing sub-circuits are disposed on the second side of the display region and are sequentially arranged along the second direction, the first direction being intersected with the second direction.

5. The display panel according to claim 4, wherein a quantity of the one portion of the temperature sensing sub-circuits is equal to a quantity of the other portion of the temperature sensing sub-circuits; and the one portion of the temperature sensing sub-circuits are equally spaced apart, and/or, the other portion of the temperature sensing sub-circuits are equally spaced apart.

6. The display panel according to claim 1, wherein the first direction is perpendicular to the second direction.

7. The display panel according to claim 1, wherein the trim circuit comprises: a plurality of trim sub-circuits;

wherein each of the trim sub-circuits is coupled to the plurality of trim control terminals, the first reference power supply terminal, the first power supply terminal, and the drive circuit, and each of the trim sub-circuits is configured to transmit a trim current to the drive circuit, under driving of a trim control signal provided by at least one of the trim control terminals, the first reference power supply signal and the first power supply signal;

wherein the target trim current is a sum of the trim currents transmitted by the plurality of trim sub-circuits.

8. The display panel according to claim 7, wherein the display region is rectangular, the non-display region encloses at least a first side, a second side and a third side of the display region, and the trim circuit comprises two trim sub-circuits;

wherein one of the two trim circuits is disposed at an intersection of the third side and the first side of the display region, and the other trim circuit is disposed at an intersection of the third side and the second side of the display region.

9. The display panel according to claim 7, wherein each of the trim sub-circuits comprises: a plurality of trim units;

wherein the plurality of trim units are coupled in one-to-one correspondence to the plurality of trim control terminals, and the trim units are further coupled to the first reference power supply terminal, the first power supply terminal and the drive circuit, and each of the trim units is configured to transmit a trim current to the drive circuit, under driving of a trim control signal provided by one of the trim control terminals coupled to the trim unit, the first reference power supply signal and the first power supply signal;

wherein the trim current is a sum of the trim sub-currents transmitted by the plurality of trim units.

10. The display panel according to claim 9, wherein each of the trim units comprises: a third switch transistor and a fourth switch transistor;

wherein a gate electrode of the third switch transistor is coupled to the first reference power supply terminal, a first electrode of the third switch transistor is coupled to the first power supply terminal, a second electrode of the third switch transistor is coupled to a first electrode pf the fourth switch transistor; and a gate electrode of the fourth switch transistor is coupled to the trim control terminal and a second electrode of the fourth switch transistor is coupled to the drive circuit.

11. The display panel according to claim 10, wherein each of the trim sub-circuit comprises: four trim units.

12. The display panel according to claim 1, wherein the temperature sensing circuit and the trim circuit are coupled to a same output node, the output node being coupled to the drive circuit.

13. The display panel according to claim 1, wherein the light-emitting control sub-circuit comprises a first light-emitting control transistor and a second light-emitting control transistor, the data write sub-circuit comprises a data write transistor, the storage sub-circuit comprises a storage capacitor, and the drive sub-circuit comprises a drive transistor;

wherein a gate electrode of the first light-emitting control transistor is coupled to the first light-emitting control terminal, a first electrode of the first light-emitting control transistor is coupled to the second power supply terminal, a second electrode of the first light-emitting control transistor is coupled to the first node;

a gate electrode of the second light-emitting control transistor is coupled to the second light-emitting control terminal, a first electrode of the second light-emitting control transistor is coupled to the first power supply terminal, and a second electrode of the second light-emitting control transistor is coupled to the first node;

a gate electrode of the data write transistor is coupled to the scan control terminal, a first electrode of the data write transistor is coupled to the data signal terminal, and a second electrode of the data write transistor coupled to the second node;

a first terminal of the storage capacitor is coupled to the second node, and a second terminal of the storage capacitor is coupled to the first power supply terminal; and a gate electrode of the drive transistor is coupled to the second node, a first electrode of the drive transistor is coupled to the first node, and a second electrode of the drive transistor is coupled to the first electrode of the light-emitting element;

wherein the first light-emitting control transistor, the second light-emitting control transistor, the data write transistor and the drive transistor are N-type transistors.

14. The display panel according to claim 1, wherein the plurality of pixels are arranged in arrays, and the plurality of pixels disposed in one row share one light-emitting control sub-circuit.

15. The display panel according to claim 1, wherein the display panel is a silicon-based organic light-emitting diode micro display panel.

16. A display device, comprising: a drive circuit, and a display panel; wherein the display panel comprises:

a substrate, having a display region and a non-display region at least partially surrounding the display region;

a plurality of pixels, disposed in the display region, wherein the plurality of pixels are coupled to a drive circuit and configured to emit light based on a common supply voltage transmitted by the drive circuit;

a temperature sensing circuit, disposed in the non-display region, wherein the temperature sensing circuit is coupled to a first reference power supply terminal, a second reference power supply terminal and a first power supply terminal, and further coupled to the drive circuit, and the temperature sensing circuit is configured to transmit a target temperature sensing current to the drive circuit based on a temperature of the display region, under driving of a first reference power supply signal provided by the first reference power supply terminal, a second reference power supply signal provided by the second reference power supply terminal and a first power supply signal provided by the first power supply terminal; and a trim circuit, disposed in the non-display region, wherein the trim circuit is coupled to the first reference power supply terminal, a plurality of trim control terminals and the first power supply terminal, and further coupled to the drive circuit, and the trim circuit is configured to transmit a target trim current to the drive circuit, under driving of a trim control signal provided by at least one of the trim control terminals, the first reference power supply signal and the first power supply signal;

wherein the target temperature sensing current and the target trim current are supplied to the drive circuit to compensate the common supply voltage;

the drive circuit is coupled to the first reference power supply terminal, the second reference power supply terminal, the plurality of trim control terminals and the plurality of pixels of the display panel, and is configured to provide the first reference power supply signal to the first reference power supply terminal, the second reference power supply signal to the second reference power supply terminal, the trim control signal to the plurality of trim control terminals, and the common supply voltage to the plurality of pixels;

the drive circuit is further coupled to the temperature sensing circuit and the trim circuit of the display panel, and is configured to compensate the common supply voltage based on the target temperature sensing current transmitted by the temperature sensing circuit and the target trim current transmitted by the trim circuit;

the pixel comprises: a pixel circuit disposed in the display region and the non-display region, and a light-emitting element disposed in the display region;

the pixel circuit is coupled to a scan control terminal, a data signal terminal, a first light-emitting control terminal, a second light-emitting control terminal, a second power supply terminal, the first power supply terminal and a first electrode of the light-emitting element, and is configured to transmit a light-emitting drive signal to the first electrode of the light-emitting element based on a scan signal provided by the scan control terminal, a first light-emitting control signal provided by the first light-emitting control terminal, a second light-emitting control signal provided by the second light-emitting control terminal, a second power supply signal provided by the second power supply terminal and the first power supply signal;

a second electrode of the light-emitting element is coupled to a common power supply terminal, the common power supply terminal is configured to be coupled to the drive circuit and to receive a common power supply voltage provided by the drive circuit, and the light-emitting element is configured to emit light based on the common power supply voltage and the light-emitting drive signal;

the pixel circuit comprises: a light-emitting control sub-circuit disposed in the non-display region, and a data write sub-circuit, a storage sub-circuit and a drive sub-circuit disposed in the display region;

the light-emitting control sub-circuit is coupled to the first light-emitting control terminal, the second light-emitting control terminal, the first power supply terminal, the second power supply terminal and a first node, the light-emitting control sub-circuit is configured to control, in response to the first light-emitting control signal, on and off between the second power supply terminal and the first node, and is configured to control, in response to the second light-emitting control signal, on and off between the second power supply terminal and the first node;

the data write sub-circuit is coupled to the scan control terminal, the data signal terminal and a second node, and the data write sub-circuit is configured to, in response to the scan signal, control on and off between the data signal terminal and the second node;

the storage sub-circuit is coupled to the second node and the first power supply terminal, and is configured to store a potential of the second node based on the first power supply signal; and the drive sub-circuit is coupled to the first node, the second node and the first electrode of the light-emitting element, and is configured to transmit the light-emitting drive signal to the light-emitting element based on a potential of the first node and the potential of the second node.

17. A method for compensating signals, applicable to a drive circuit comprising the display device as defined in claim 16, the method comprising:

providing a first reference power signal at a first potential to a first reference power supply terminal, providing a second reference power signal at a first potential to a second reference power supply terminal, providing a trim control signal at a first potential to at least one of a plurality of trim control terminals, and providing a trim control signal at a second potential to other trim control terminals other than the at least one trim control terminal;

receiving a target temperature sensing current transmitted by a temperature sensing circuit, wherein the target temperature sensing current is generated by the temperature sensing circuit based on a temperature of the display region of the display panel, under driving of the first reference power signal of the first potential, the second reference power signal of the first potential and the first power signal provided by a coupled first power supply terminal;

receiving a target trim current transmitted by a trim circuit, wherein the target trim current is generated by the trim circuit under driving of the first reference power signal of the first potential, the trim control signal of the first potential, and the first power signal provided by the coupled first power supply terminal; and compensating a common supply voltage based on the target temperature sensing current and the target trim current, and transmitting the compensated common supply voltage to the plurality of pixels to drive a plurality of pixels to emit light.

18. The method according to claim 17, wherein compensating the common supply voltage based on the target temperature sensing current and the target trim current comprises:

determining a compensation current in response to accumulation of the target temperature sensing current and the target trim current;

converting the compensation current to a compensation voltage; and acquiring a compensated common supply voltage by accumulating the compensation voltage to the common supply voltage prior to compensation.

* * * * *